US012657171B2

(12) United States Patent
Asiri et al.

(10) Patent No.: US 12,657,171 B2
(45) Date of Patent: Jun. 16, 2026

(54) SYSTEM AND METHOD FOR ARTIFICIAL INTELLIGENCE DRIVEN BLOCKCHAIN FRAMEWORK SUPPORTING SECURE SCALABLE SMART CITY DEVELOPMENT

(71) Applicants: KING KHALID UNIVERSITY, Abha (SA); SHAQRA UNIVERSITY, Shaqra (SA)

(72) Inventors: Mashael Mohammed Asiri, Abha (SA); Someah Alangari, Aldawadmi (SA)

(73) Assignees: KING KHALID UNIVERSITY, Abha (SA); SHAQRA UNIVERSITY, Shaqra (SA)

( * ) Notice: Subject to any disclaimer, the term of this patent is extended or adjusted under 35 U.S.C. 154(b) by 0 days.

(21) Appl. No.: 19/397,335

(22) Filed: Nov. 21, 2025

(65) Prior Publication Data

US 2026/0079896 A1     Mar. 19, 2026

(51) Int. Cl.
*G06F 16/21*          (2019.01)
(52) U.S. Cl.
CPC .................................. *G06F 16/211* (2019.01)
(58) Field of Classification Search
CPC .................................................. G06F 16/211
See application file for complete search history.

(56) References Cited

U.S. PATENT DOCUMENTS

2013/0016612 A1* 1/2013 Vasseur ................... H04L 45/48
                                                       370/254
2022/0108806 A1* 4/2022 Kommalapati ....... H04L 69/321

OTHER PUBLICATIONS

Ferreira, Célio Márcio Soares, et al. "IoT registration and authentication in smart city applications with blockchain." Sensors 21.4 (2021): 1323. (Year: 2021).*

(Continued)

*Primary Examiner* — William Spieler
(74) *Attorney, Agent, or Firm* — Maschoff Brennan

(57)             ABSTRACT

The present invention relates to system and method for artificial intelligence driven blockchain framework supporting secure scalable smart city development. The present invention relates to a smart-city telemetry system device and an AI-driven computational method configured to autonomously generate and adapt blockchain ledger behavior based on multi-domain urban data. The invention provides a unified hardware-software system capable of receiving heterogeneous telemetry from transportation, energy, public-safety, and environmental infrastructures, performing fine-grained temporal segmentation, reconstructing missing values through techniqueic interpolation, and producing fused multi-field records that accurately represent the real-time state of city operations. These fused records are processed through a multi-layer analytical engine that derives internal representation values capturing security deviations, privacy-sensitivity indicators, and workload-progression patterns. Based on these analytical outputs, the system generates candidate ledger-configuration sets, evaluates them through deviation-based profiling, and autonomously selects an optimal configuration for the next blockchain execution cycle.

19 Claims, 7 Drawing Sheets

(56) References Cited

OTHER PUBLICATIONS

Khan, Abdullah Ayub, et al. "Secure remote sensing data with blockchain distributed ledger technology: a solution for smart cities." Ieee Access 12 (2024): 69383-69396. (Year: 2024).*

Khan, Zaheer, Abdul Ghafoor Abbasi, and Zeeshan Pervez. "Blockchain and edge computing-based architecture for participatory smart city applications." Concurrency and Computation: Practice and Experience 32.12 (2020): e5566. (Year: 2020).*

Khalil, Usman, Owais Ahmed Malik, and Saddam Hussain. "A blockchain footprint for authentication of IoT-enabled smart devices in smart cities: State-of-the-art advancements, challenges and future research directions." IEEE Access 10 (2022): 76805-76823. (Year: 2022).*

Khalil, Usman, et al. "A comparative analysis on blockchain versus centralized authentication architectures for IoT-enabled smart devices in smart cities: a comprehensive review, recent advances, and future research directions." Sensors 22.14 (2022): 5168. (Year: 2022).*

* cited by examiner

100 receiving the smart-city telemetry originating a plurality of subsystems of a smart-city infrastructure and converting the smart-city telemetry received into an organized digital structure by aligning time-indexed entries, associating subsystem identifiers with each entry, and generating consolidated multi-field telemetry records

102 processing the organized digital structure through an AI-based analytical sequence that applies successive weighted computational operations to derive internal representation values that characterize security-relevant deviations, privacy-relevant sensitivity indicators, and scalability-relevant workload progressions

104 generating multiple candidate ledger-configuration sets, each configuration set including timing-control fields, validation-control fields, authorization-control fields, and data-handling-control fields, and evaluating the candidate ledger-configuration sets by comparing at least a portion of the internal representation values against configuration-set fields

106 selecting one of the candidate ledger-configuration sets based on the evaluation and generating blockchain ledger behavior instructions by interpreting software-engineering specifications, extracting conditional execution descriptions, mapping the conditional execution descriptions to state-adjustment structures, and encoding the state-adjustment structures into machine-interpretable instruction sequences

108 deploying the machine-interpretable instruction sequences across distributed processing nodes of the blockchain infrastructure, receiving execution telemetry from the distributed processing nodes, and modifying at least one ledger-configuration field or instruction-sequence ordering based on comparisons between the execution telemetry and updated internal representation values produced by the AI-based analytical sequence

200 telemetry acquisition unit (202)

segmentation unit (204)

temporal-alignment unit (206)

interpolation unit (208)

fusion unit (210)

AI-analytical unit (212)

configuration-evaluation unit (214)

instruction-construction unit (216)

| Index | Sensor Fusion Delay (ms) | AI Anomaly Score | Privacy Sensitivity Level | Ledger Update Latency (ms) |
|---|---|---|---|---|
| T01 | 50.128 | 0.454 | 0.398 | 99.807 |
| T02 | 38.868 | 0.366 | 0.051 | 157.19 |
| T03 | 40.474 | 0.48 | 0.797 | 150.732 |
| T04 | 49.589 | 0.604 | 0.652 | 132.77 |
| T05 | 44.156 | 0.559 | 0.37 | 86.076 |
| T06 | 86.896 | 0.324 | 0.469 | 124.277 |
| T07 | 80.247 | 0.302 | 0.5 | 86.368 |
| T08 | 68.318 | 0.62 | 0.092 | 65.901 |
| T09 | 46.24 | 0.185 | 0.819 | 102.086 |
| T10 | 92.401 | 0.9 | 0.763 | 57.98 |

Figure 6

| Index | Traffic Density | Energy Grid Load (%) | Emergency Alerts | Pollution Spike Index |
|---|---|---|---|---|
| W01 | 93.0 | 53.422 | 8.0 | 0.531 |
| W02 | 80.0 | 88.054 | 9.0 | 0.284 |
| W03 | 50.0 | 76.956 | 11.0 | 1.333 |
| W04 | 97.0 | 68.95 | 4.0 | 0.461 |
| W05 | 81.0 | 70.869 | 7.0 | 1.25 |
| W06 | 170.0 | 45.046 | 2.0 | 0.217 |
| W07 | 66.0 | 80.545 | 0.0 | 1.328 |
| W08 | 54.0 | 72.794 | 10.0 | 0.798 |
| W09 | 115.0 | 53.981 | 2.0 | 0.875 |
| W10 | 83.0 | 81.843 | 5.0 | 0.765 |
| W11 | 73.0 | 62.016 | 11.0 | 1.066 |
| W12 | 140.0 | 49.985 | 3.0 | 0.47 |

Figure 7

SYSTEM AND METHOD FOR ARTIFICIAL INTELLIGENCE DRIVEN BLOCKCHAIN FRAMEWORK SUPPORTING SECURE SCALABLE SMART CITY DEVELOPMENT

FIELD OF THE INVENTION

The present invention relates to system and method for artificial intelligence driven blockchain framework supporting secure scalable smart city development.

BACKGROUND OF THE INVENTION

Smart-city infrastructures generate massive quantities of telemetry across diverse subsystems such as transportation, energy distribution, public-safety monitoring, and environmental measurement frameworks. Existing blockchain-based solutions for public infrastructure management lack the computational fluidity needed to adapt ledger parameters, validation rules, and authorization behaviors in response to real-time city conditions. Conventional AI modules also struggle to ingest raw telemetry because it commonly exhibits time-drift, missing entries, inconsistent formatting, and unbalanced subsystem contributions. Further, blockchain instruction sequences deployed across distributed nodes often become suboptimal when load conditions shift, resulting in execution inefficiency, latency spikes, or privacy-indicating anomalies.

There remains a need for an integrated device capable of acquiring telemetry, reconstructing missing values, aligning subsystem timestamps, and generating fused telemetry records that can serve as a unified input for advanced AI-based transformation layers. Moreover, there is a need for a hardware-assisted machine that converts analytical outputs into domain-aware blockchain instruction streams, validates instruction ordering, and redistributes executed instructions across distributed nodes while continuously adapting ledger-configuration fields. The disclosed invention fulfills these needs.

The implementation of smart-city infrastructures has accelerated over the past decade, driven by increasing urban populations, heightened demand for safety, improved transportation flow, optimized energy distribution, and real-time environmental monitoring. Cities now deploy thousands of interconnected sensors, IoT devices, distributed meters, surveillance units, vehicular telematics systems, and edge-computing nodes. This ecosystem produces an enormous volume of smart-city telemetry, including traffic-density measurements, power grid load distributions, emergency service response signals, pollution index readings, and countless other data streams. While this telemetry offers unprecedented visibility into city operations, existing technological ecosystems have struggled to harness it efficiently, particularly when such data needs to be integrated with secure systems such as blockchain-based governance layers. The background surrounding existing solutions reveals several limitations in how urban telemetry is processed, interpreted, stored, and acted upon.

Distributed blockchain-processing nodes typically operate in isolation, each executing the same instruction sets without awareness of node-specific load characteristics. Existing systems do not consider memory availability, processing speed variation, or propagation delays when deploying instructions. As a result, identical instruction streams may perform efficiently on some nodes while causing bottlenecks on others. Although some systems attempt load balancing, they usually focus on transaction distribution rather than adaptive reordering or reconfiguration of the underlying instruction sets. This mismatch between node capability and instruction complexity reduces system efficiency, increases validation delays, and may cause intermittent ledger desynchronization.

Collectively, these drawbacks demonstrate the technical gap the present invention aims to overcome. Existing systems fail to combine fine-grained temporal alignment, multi-domain fusion, AI-driven anomaly and sensitivity detection, dynamic blockchain configuration generation, adaptive instruction encoding, and real-time execution-feedback-based modification. Without an integrated hardware-machine and analytical pipeline capable of linking city telemetry directly to blockchain behavior, smart-city ecosystems remain confined to static, inefficient, non-adaptive frameworks that are insufficient for modern urban governance requirements.

SUMMARY OF THE INVENTION

The present invention relates to system and method for artificial intelligence driven blockchain framework supporting secure scalable smart city development. The invention provides a smart-city telemetry processing device and associated AI-driven computational machine configured to dynamically interpret, transform, and utilize smart-city telemetry for autonomous blockchain ledger behavior adaptation. The device includes a telemetry acquisition structure, a temporal-segmentation and alignment module, an interpolation and reconstruction engine, a fusion processor for generating multi-field telemetry records, and an onboard analytical engine implementing weighted, multi-layer transformation workflows. The machine further includes a ledger-configuration generator capable of mutating candidate configuration sets, a configuration evaluator for selecting optimal configuration sets, and an instruction-construction engine that interprets domain specifications, maps conditional triggers to state-adjustment structures, and encodes them into machine-executable instruction streams.

The objects of the present invention center on overcoming the technical and structural limitations inherent in existing smart-city telemetry processing frameworks, AI-analytics engines, and blockchain-based governance architectures by providing a unified, adaptive, and deeply integrated system and device. A principal object of the invention is to enable a highly coordinated computational environment in which multi-domain smart-city telemetry originating from transportation, energy, public-safety, and environmental infrastructures is automatically converted into a temporally aligned, fused, and semantically enriched digital structure capable of supporting advanced analytics. Another object of the invention is to provide a mechanism by which an AI-driven analytical engine embedded within the device produces refined internal representation values characterizing security deviations, privacy-sensitivity indicators, and workload-progression signatures that can be directly used to modify blockchain ledger behavior without human intervention. The invention also seeks to maintain continuous feedback integration by processing execution telemetry returned from distributed blockchain nodes, thereby recalibrating ledger configuration fields, pointer offsets, and instruction-sequence ordering in response to dynamically shifting operational conditions. Another object is to provide a dedicated hardware-based smart-city computational machine capable of executing all acquisition, preprocessing, analytical, configuration-evaluation, and instruction-generation operations within a single structural device, thus ensuring determinism, minimizing latency, and preserving telemetry consistency. The invention therefore aims to deliver a cohesive platform capable of supporting data-driven urban governance, enhancing blockchain system agility, improving anomaly detection accuracy, and ensuring privacy-aware computational behavior while minimizing fragmentation and inefficiency across large-scale distributed smart-city networks.

BRIEF DESCRIPTION OF FIGURES

These and other features, aspects, and advantages of the present invention will become better understood when the following detailed description is read concerning the accompanying drawings in which like characters represent like parts throughout the drawings, wherein:

FIG. 1 displays flow chart of a computer-implemented method for processing smart-city telemetry to generate and adapt blockchain ledger behavior through AI-based analytical operations;

FIG. 6 illustrates a table depicting the temporal variation of four critical telemetry parameters;

FIG. 7 illustrates a table depicting the temporal progression of four operational parameters;

Figure 2:
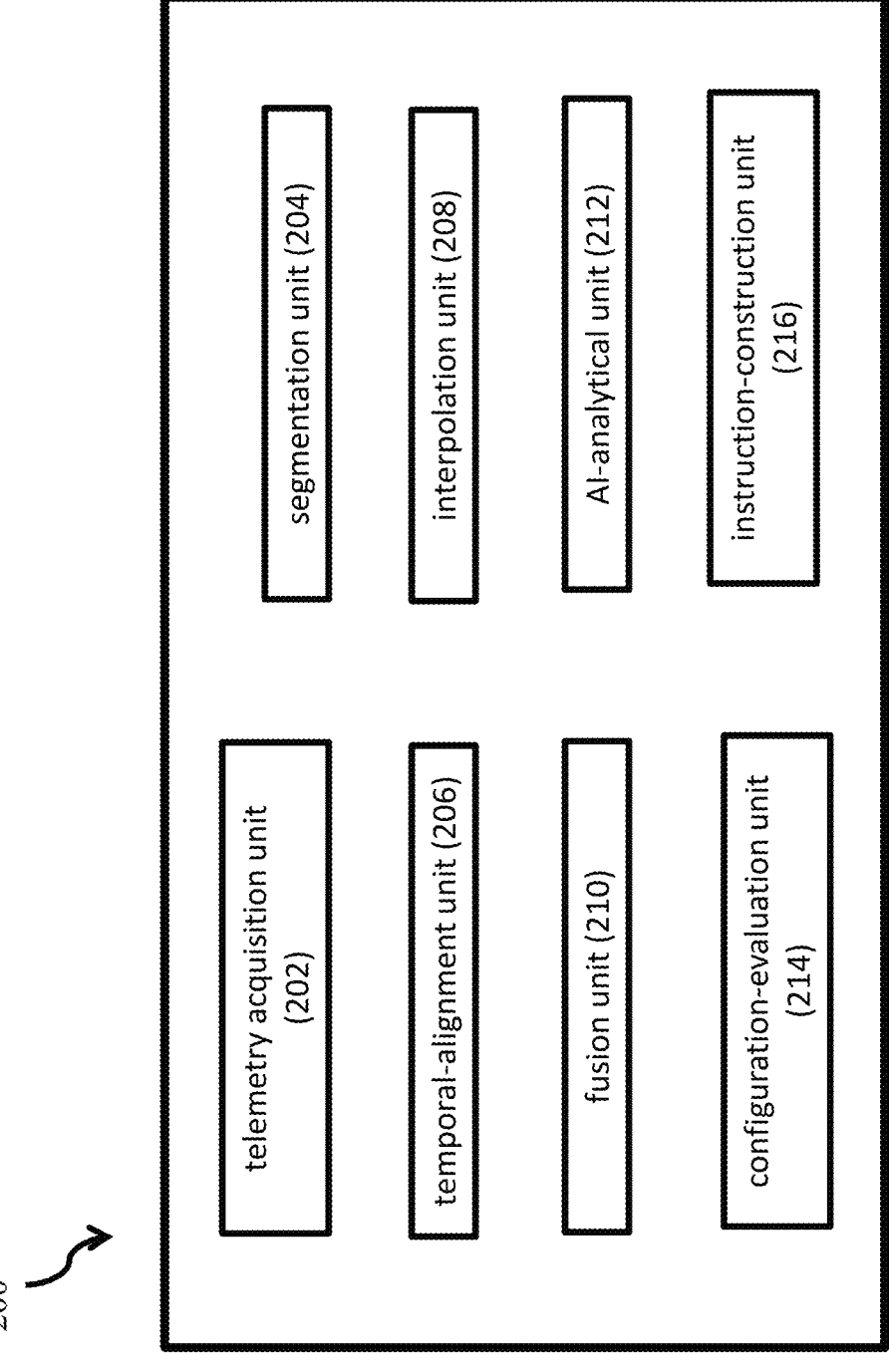
FIG. 2 displays a block diagram of a computer-implemented system for processing smart-city telemetry to generate and adapt blockchain ledger behavior through AI-based analytical operations.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure.

DETAILED DESCRIPTION OF THE INVENTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail with reference to the accompanying drawings.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device. Indeed, an executable code of a device or module could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network. Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

In accordance with the exemplary embodiments, the disclosed computer programs or modules can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages. Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VOIP, Voice-over-ATM, or other comparable protocols used for voice data communications. In one implementation, the network includes a cellular telephone network configured to enable exchange of text or SMS messages. Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

Referring to FIG. 1, a flow chart for a computer-implemented method for processing smart-city telemetry to generate and adapt blockchain ledger behavior through AI-based analytical operations, the method comprising the steps of is illustrated. The method 100 comprises:

At step 102, the method 100 includes receiving smart-city telemetry originating from a plurality of subsystems of a smart-city infrastructure including transportation, energy, public-safety, and environmental subsystems of a smart-city infrastructure and converting the received telemetry into an organized digital structure by aligning time-indexed entries, associating subsystem identifiers with each entry, and generating consolidated multi-field telemetry records; At step 104, the method 100 includes processing the organized digital structure through an AI-based analytical sequence that applies successive weighted computational operations to derive internal representation values that characterize security-relevant deviations, privacy-relevant sensitivity indicators, and scalability-relevant workload progressions; At step 106, the method 100 includes generating multiple candidate ledger-configuration sets, each configuration set including timing-control fields, validation-control fields, authorization-control fields, and data-handling-control fields, and evaluating the candidate ledger-configuration sets by comparing at least a portion of the internal representation values against configuration-set fields; At step 108, the method 100 includes selecting one of the candidate ledger-configuration sets based on the evaluation and generating blockchain ledger behavior instructions by interpreting software-engineering specifications, extracting conditional execution descriptions, mapping the conditional execution descriptions to state-adjustment structures, and encoding the state-adjustment structures into machine-interpretable instruction sequences; and At step 110, the method 100 includes deploying the machine-interpretable instruction sequences across distributed processing nodes of the blockchain infrastructure, receiving execution telemetry from the distributed processing nodes, and modifying at least one ledger-configuration field or instruction-sequence ordering based on comparisons between the execution telemetry and updated internal representation values produced by the AI-based analytical sequence.

In an embodiment, converting the received telemetry into the organized digital structure comprises executing, under control of the processor, a multi-stage data restructuring procedure that includes initially segmenting the incoming telemetry into temporally bounded slices according to subsystem timestamps, assigning to each telemetry slice an index generated from a monotonically incrementing counter, constructing an intermediate alignment table by comparing timestamps of slices across transportation, energy, public-safety, and environmental categories, interpolating missing values in the slices by referencing nearest-neighbor slices within the alignment table, combining subsystem-specific values into fused multi-field records by applying predetermined positional mapping rules, and generating a consolidated structure that stores, for each temporal position, a fused record comprising subsystem identifiers, numerical measurements, boundary-limit flags, and correlation markers.

The method begins by slicing the incoming telemetry stream into temporally bounded segments based on the timestamps actually embedded in the transportation, energy, public-safety, and environmental subsystem feeds. For instance, if transportation data arrives every 200 ms, energy data every 500 ms, and air-quality data every 1 s, the processor first identifies the natural timestamp intervals of each subsystem and generates slices that correspond to those intervals without forcing them into a uniform grid. This preserves the native sampling integrity of each subsystem. Each slice is then assigned a unique index produced by a monotonically increasing counter maintained by the processor's memory processor. The assignment of monotonically increasing indices ensures that every slice, even when two slices share identical timestamps or when subsystems deliver asynchronous data bursts, is deterministically ordered for later reconstruction. This index assignment is crucial for reproducibility and becomes a technical advancement over conventional systems where asynchronous telemetry causes ambiguous temporal ordering.

Once the slices are indexed, the processor constructs an intermediate alignment table that functions as a temporal-synchronization reference grid across all subsystem categories. The alignment table is generated by comparing timestamps of slices from transportation, energy, public-safety, and environmental feeds, and computing offset values that quantify how far each subsystem deviates from the others at a given temporal position. For example, if a transportation slice is timestamped at 10:00:00.100, while an energy slice closest to it is timestamped at 10:00:00.400, the alignment table records a +300 ms offset for the energy subsystem for that interval. If the table detects missing entries—for instance, a public-safety camera frame missing at a time when other subsystems have data—the missing entry is explicitly flagged. This table becomes a structural backbone that supports later interpolation and correction operations, providing a technical effect of ensuring temporal coherence even when subsystem clocks drift or data packets drop.

The interpolation stage follows, where missing or incomplete slice values are reconstructed by referencing nearest-neighbor slices identified in the alignment table. For example, if a public-safety subsystem fails to deliver an entry at index 125 but entries exist at indices 124 and 126, the processor computes a reconstructed value by applying a rule such as weighted linear interpolation. The rule may give higher weight to the nearer timestamp, or in the case of non-linear sensor data, may use cubic interpolation or domain-specific smoothing. The reconstruction is not guess-work; it is based on quantifiable relationships between surrounding slices and guided by the alignment table that has already established which slices are temporally closest. This produces a technical effect of restoring structural completeness, ensuring that the AI-based analytical sequence does not propagate noise or gaps forward into later layers.

After interpolation, the processor moves into the fusion stage, where subsystem-specific values of each slice are combined into fused multi-field records. This is achieved by applying positional mapping rules stored in a mapping dataset. These rules specify exactly which position in the fused record corresponds to transportation speed values, energy consumption values, environmental particulate-matter readings, or public-safety event markers. For example, the mapping dataset may define that positions 0-4 correspond to transportation telemetry fields (vehicle count, average speed, congestion index, lane-occupancy values, and anomaly flags), positions 5-7 correspond to energy subsystem measurements (current load, voltage deviation, and load-variance flag), and positions 8-12 correspond to environmental metrics (PM2.5, PM10, $CO_2$ concentration, noise levels, and thermal readings). The processor constructs the fused record in deterministic order, ensuring the AI transformation layers later receive uniform, position-consistent vectors regardless of which subsystem originally provided which data. This positional consistency is a technical advancement over classical smart-city telemetry pipelines that often deliver variable-length or subsystem-dependent formats, complicating AI ingestion.

During fusion, the processor also appends boundary-limit flags that indicate whether individual subsystem measurements fall outside predefined operational boundaries. For example, if the environmental subsystem reports a PM2.5 value of 260 $\mu g/m^3$ and the boundary dataset defines the safe limit as 200 $\mu g/m^3$, a boundary-limit flag is set to 1 for that field. Similarly, if the transportation subsystem reports a sudden zero-speed reading for all vehicles on a major road—indicative of gridlock or possible sensor failure—the boundary-limit flag captures this deviation. These flags serve as early indicators for security anomalies or public-safety risks and provide an immediate technical effect: they enable the AI analytical sequence to recognize deviations without requiring additional computation to detect boundary breaches.

In addition, correlation markers are computed and stored within each fused record. These markers capture relationships between subsystems at that exact temporal position.

For example, if the alignment table shows that an unexpected energy spike occurred at the same time as a transportation congestion pattern and elevated public-safety audio signatures, the correlation marker for that fused record may capture an inter-subsystem correlation coefficient reflecting this synchronized anomaly. The processor may compute such markers using Pearson correlation, cosine similarity, cross-covariance, or domain-specific scoring functions. These correlation markers become vital inputs for later AI layers that infer security-relevant deviations or privacy-sensitivity patterns.

Finally, after fusion, reconstruction, interpolation, alignment, and boundary augmentation are complete, the processor generates a consolidated structure that holds, for each temporal index, a complete fused record comprising subsystem identifiers, numerical measurements, boundary-limit flags, and correlation markers. The consolidated structure behaves like a temporally ordered matrix where every row corresponds to a time slice and every column corresponds to a deterministically mapped subsystem parameter. The technical effect of generating this consolidated, alignment-corrected, correlation-enhanced structure is that subsequent AI analytics receive data that is clean, temporally consistent, semantically uniform, and enriched with contextual indicators. This increases the accuracy and stability of internal representation values, thereby improving the system's ability to adapt blockchain ledger behavior in real time. By ensuring that each fused multi-field record carries both the raw measurement values and engineered contextual markers, the embodiment enables a level of analytical precision that conventional telemetry pipelines do not achieve, ultimately supporting more reliable ledger-configuration adaptation.

In an embodiment, processing the organized digital structure through the AI-based analytical sequence comprises applying a layered transformation workflow that includes receiving the fused multi-field records as input, distributing the records across successive computational layers, at each layer calculating transformed values by combining weighted contributions from the preceding layer, generating intermediate activation sets that represent inferred patterns in security anomalies, privacy characteristics, and load fluctuations, iteratively updating the weights associated with the layers based on gradient-like adjustments computed from discrepancies between current activation sets and reference pattern libraries stored in an analytical memory structure, and producing, as final outputs of the workflow, internal representation values stored in a representation array accessible to the evaluation of ledger-configuration sets.

The fused multi-field records—each containing synchronized transportation, energy, public-safety, and environmental measurements—are first received into an input buffer that feeds a computational pipeline comprised of sequential analytical layers. Each layer executes a mathematically defined transformation on the incoming record vector. For instance, when a fused record contains a 40-dimensional vector of subsystem-normalized values, the first analytical layer may apply a weighted matrix multiplication of size 40×64 to generate a 64-dimensional transformed vector. This transformation uses pre-initialized weights that have been trained or tuned to emphasize inter-subsystem relationships; for example, sudden deviations in public-safety incident rates relative to energy-grid load patterns are amplified because such interactions often indicate cyber-physical anomalies.

Once the first layer produces its transformed output, the workflow distributes the resulting vector to the next computational layer, which may apply a non-linear activation function such as a parametric rectifier, sigmoid, or hyperbolic tangent to extract latent anomaly structures. As the workflow continues across multiple layers (typically 3-12 layers depending on configuration), the system performs iterative weight corrections designed to minimize the discrepancy between the activation sets produced by the current telemetry and the reference activation patterns stored in an analytical memory structure. These reference patterns may include signatures of prior detected attacks, previously encountered privacy violations such as re-identifiable metadata access, or examples of surging workload sequences observed during city-wide events. The system computes these discrepancies using a gradient-like adjustment rule. For example, if the system detects that the current activation for "privacy sensitivity vector" exceeds the expected value from the library by 12%, the gradient computation modifies the relevant weight matrices proportionally—such as increasing the weight that suppresses personally identifiable correlations—so that future analysis more strongly reacts to this class of event. This continuous re-alignment ensures the analytical sequence improves its responsiveness to the evolving behavior of the smart-city ecosystem.

The final stage of the layered workflow aggregates all intermediate activations into a cohesive representation array that quantitatively expresses the state of the city's security, privacy, and workload dynamics. Suppose the internal representation array ultimately contains three sub-vectors: a 32-element security anomaly vector, a 24-element privacy-sensitivity vector, and a 20-element load-progression vector. These sub-vectors collectively form the representation values used by later stages of the blockchain adaptation logic. The system writes these values into a structured representation store, which enables the configuration-evaluation unit to compare them against various candidate ledger-configuration sets. The technical effect of this layered transformation workflow is that raw, heterogeneous telemetry—originally noisy, uncorrelated, and multi-modal—becomes converted into a stable, high-signal representation that captures subtle cross-domain behaviors. This allows the blockchain ledger to adapt not on the basis of simple rule-based inputs, but using a deeply contextual understanding of emerging smart-city conditions.

In an embodiment, generating the candidate ledger-configuration sets comprises constructing, for each configuration set, a multi-field structure including a timing-control field, a validation-control field, an authorization-control field, and a data-handling-control field, and further performing controlled mutation operations on each of the multi-field structures by applying, to each field, a mutation rule specifying allowable directional adjustments, minimum and maximum magnitudes, and inter-field consistency constraints; and wherein each mutated configuration set is stored as a row entry in a configuration matrix, the configuration matrix being subsequently used by the evaluation procedure. The processor begins by constructing, for each candidate, a multi-field structure that includes four principal control fields—timing-control, validation-control, authorization-control, and data-handling-control. Each field represents a distinct behavioral dimension of the blockchain ledger. For example, the timing-control field may contain values defining block interval durations, permissible timestamp drift, or timeout thresholds for transaction propagation. The validation-control field may include quorum thresholds, consensus weight factors, or validation-latency boundaries. The authorization-control field typically encodes rules for node permissions, signature requirements, or privilege levels for smart-city authority nodes. The data-handling-control field may specify record packing densities, data retention schedules, or on-chain/off-chain partitioning parameters. By encoding these dimensions into a single multi-field structure, the system establishes a stable template for generating operational variations that will later be evaluated by the AI-generated internal representation values.

Once these baseline structures are created, the processor performs controlled mutation operations on each multi-field structure to generate alternative configurations. Unlike random mutation techniques, the mutation operations here are rule-governed, deterministic, and constrained by predefined operational boundaries to ensure that mutated configurations remain implementable within the blockchain infrastructure. Each field is associated with a mutation rule that specifies (i) the allowable direction of modification, (ii) the minimum and maximum permissible magnitude of change, and (iii) any inter-field constraints that must be satisfied. For example, a timing-control field representing a block interval of 5 seconds may be subject to a mutation rule stating that it can increase or decrease by up to 25%, but cannot fall below 2 seconds or exceed 10 seconds. Similarly, a validation-control field such as a quorum threshold may be mutated by adjusting it upward or downward by discrete steps of 5%, but only if the resulting value maintains consistency with the timing-control field—for instance, a high quorum threshold cannot be paired with a very short block interval because the consensus mechanism might not complete in time.

The processor enforces these rules algorithmically. Consider a configuration set with a 70% quorum threshold in the validation-control field and a baseline 6-second block time in the timing-control field. A mutation rule may specify that if the quorum threshold is raised above 75%, the block interval must be increased by at least 10% to ensure that consensus validation time is not violated. When the system applies a mutation, it checks this inter-field constraint and automatically adjusts the timing-control field to 6.6 seconds if the validation field is mutated upward to 80%. Conversely, if the timing-control field is mutated downward, the system may proportionally lower the quorum threshold to maintain feasible validation latencies. These examples illustrate how the embodiment ensures that mutation operations are not independent but instead respect systemic relationships that guarantee blockchain stability. This represents a technical advancement over naive parameter variation methods that often produce invalid or underperforming configurations.

The authorization-control and data-handling-control fields are likewise mutated under strict rules. For instance, a mutation of the authorization-control field might involve tightening signature-verification levels—e.g., increasing required key-length or mandating multi-signature requirements—but only if the associated data-handling-control field indicates sufficient bandwidth and storage availability to support heavier cryptographic loads. If a mutation attempts to increase authorization strictness while the data-handling field reflects low bandwidth conditions, the system rejects or compensates for the mutation by adjusting data-packing densities or shifting certain records off-chain. The processor thereby ensures that mutated configurations maintain internal operational balance, creating technically valid variations that the evaluation engine can meaningfully compare.

As each mutation rule is applied, the processor generates a new configuration set distinct from the baseline. Each mutated configuration set is stored as a row entry in a configuration matrix. This matrix acts as a structured repository in which each row corresponds to one candidate configuration, and each column corresponds to one of the control fields. For example, row 5 of the matrix may encode a configuration having a 7-second block time, an 85% quorum threshold, a multi-signature requirement for administrative actions, and a compressed data-packing policy. The configuration matrix may store tens, hundreds, or thousands of such configurations, depending on the breadth of mutation rules and subsystem constraints.

In an embodiment, evaluating the candidate ledger-configuration sets comprises retrieving, for each configuration set, the timing-control, validation-control, authorization-control, and data-handling-control fields, computing a relevance vector by selecting portions of the internal representation values corresponding to security deviation intensities, privacy sensitivity weights, and workload-progression markers, applying a comparison procedure that subtracts the relevance vector from the configuration set fields to generate a configuration-deviation profile, comparing elements of the configuration-deviation profile with acceptance ranges stored in a configuration-reference structure, and designating the configuration set whose configuration-deviation profile most closely satisfies the acceptance ranges as the selected configuration set.

Each of these configuration sets is internally encoded as a multi-field vector; for example, a configuration set may include four principal components: a timing-control field that specifies block interval targets and maximum permitted propagation delays, a validation-control field specifying required validation quorum or consensus weights, an authorization-control field defining role-based access thresholds, and a data-handling-control field representing permissible privacy-handling rules for transaction entries. These fields might collectively form a 20-dimensional vector, such as [t1, t2, v1, v2, a1, a2, d1, d2, . . . ], where each element corresponds to a configurable parameter.

To evaluate these configuration sets meaningfully, the system next generates a relevance vector derived from the internal representation values generated by the AI layers. The relevance vector selectively extracts only those components of the representation array that reflect the current operational pressures or risk indicators. For example, if the AI sequence produces a 76-dimensional representation array, the evaluation unit may extract 12 dimensions related to security deviation intensities, 8 dimensions related to privacy-sensitivity weights, and 6 dimensions representing workload-progression markers.

Once the relevance vector is formed, the system performs a mathematical comparison between it and each candidate configuration vector. This comparison is performed through a vector subtraction operation that yields a configuration-deviation profile for each candidate. For example, suppose the relevance vector contains a high security-deviation signal of magnitude 0.82 on a normalized scale, indicating recent detection of anomalous cross-domain sensor activity. If a candidate configuration has a validation-control setting with a quorum threshold that assumes typical deviation levels around 0.40, the subtraction may produce a deviation element of approximately 0.42, indicating that the candidate configuration provides insufficient validation rigor for the present threat level. Conversely, if the privacy-sensitivity indicators in the relevance vector are low, and a candidate configuration mandates aggressive data-masking operations, the deviation profile may show a negative deviation (e.g., −0.21), indicating over-sensitivity that could degrade system performance without providing meaningful benefit. This deviation profile therefore captures how "off-target" each configuration is relative to the present operational conditions.

Once all deviation values of all candidate sets are compared, the evaluation unit calculates which configuration's deviation profile most closely satisfies the acceptance ranges. In one example, three candidate configuration sets may produce average deviation magnitudes of 0.12, 0.04, and 0.09 across all fields. In that scenario, the second configuration—having deviation values closest to zero and lying within the majority of acceptance intervals—would be designated as the selected configuration set.

In an embodiment, interpreting the software-engineering specifications comprises performing a multi-phase parsing operation that includes scanning the specifications to identify domain-level descriptions, extracting functional expressions from the domain-level descriptions, generating hierarchical identifiers by assigning depth-based indices to nested expressions, constructing a relational graph connecting the hierarchical identifiers based on expression placement and conditional dependencies, propagating constraints across the relational graph to generate constraint-enriched representations of each expression, and storing the resulting constraint-enriched representations in a structured specification dataset used for subsequent mapping steps. First the specification text is tokenized and scanned with a combination of lexical rules and domain-aware grammar fragments (for example using a PEG/ANTLR front-end tuned with tokens for domain names such as "transportation", "energy", "public-safety", and domain actions like "raise-quorum", "delay-block" or "mask-field") so that domain-level descriptions are programmatically identified rather than treated as free text. As each domain-level block is located the parser extracts functional expressions using pattern-recognition and expression grammars (for instance, detecting conditional phrases such as "if sensor-failure within 30 s then increase validation-quorum by 10%" and converting them into a canonical expression form). Nested expressions are assigned hierarchical identifiers created from depth-based indices that reflect their position in the specification tree—e.g. transportation:expr_2.1.4 meaning domain transportation, top-level expression 2, nested child 1, nested child 4—so every expression can be referenced unambiguously by downstream modules. The pipeline next constructs a relational graph whose nodes are these hierarchical identifiers and whose directed edges encode explicit conditional dependencies (edge from trigger to action), implied precedence (edge from parent expression to nested child), and resource or variable sharing (edges linking expressions that reference the same ledger field or telemetry tag). Constraint propagation is then executed across this graph: constraint facts (such as numeric ranges, unit types, timing windows, and mutually exclusive actions) are propagated using a systematic rule engine (for example an AC-3 style arc-consistency pass for numeric and discrete domains and a forward-chaining rule evaluation for logical constraints) so that each node's representation becomes "constraint-enriched"—carrying not only the original functional expression but also resolved variable types, normalized units (ms, seconds, $\mu g/m^3$), allowed value ranges, and provenance metadata pointing back to the specification lines. In practice this means a conditional like the example above is converted into a constraint-enriched record that specifies: trigger=sensor-failure with detection-window=30 s, target-field=validation-quorum, allowable-adjustment=+10% (min/max bounds resolved from system policy), and side-conditions=if data-handling.bandwidth>=X then apply else postpone, together with a priority index computed from explicit or implicit importance markers in the specification. Conflicts discovered during propagation (for example two domain expressions that propose incompatible adjustments to the same ledger field under overlapping triggers) are resolved by a deterministic conflict-resolution strategy that may include: (i) precedence by hierarchical depth or explicitly declared priority, (ii) scoring using an importance weight and selecting the highest-scoring constraint, or (iii) emitting a flagged inconsistency that is annotated in the structured dataset for later human review; the system records the chosen resolution and the rationale so mapping remains auditable. The final constraint-enriched representations are serialized into a structured specification dataset (for example JSON-LD or a compact binary format) that includes node identifiers, normalized expressions, constrained parameter ranges, dependency edges, priority indices, versioning metadata, and confidence/provenance tags; this dataset is optimized for fast lookup by the instruction-construction stage and is indexed by trigger identifiers, affected ledger fields, and domain context. To make the embodiment concrete, consider a short specification fragment: "Transportation nodes must mask user-IDs when congestion>80%; if repeated mask-failures occur, escalate authorization to multi-sig." The parser produces two hierarchical identifiers (transportation:expr_3 and transportation:expr_3.1), a relational edge from the first to the escalation expression, a constraint that congestion is measured in percent and bound [0,100], an action mapping that associates mask user-ID with the data-handling-control field, and an escalation rule that raises authorization-control to multi-sig only if mask-failures>=3 within a sliding 10-minute window—all stored as enriched records that the mapping module can deterministically convert into state-adjustment candidates.

In an embodiment, mapping the conditional execution descriptions to the state-adjustment structures comprises detecting conditional triggers encoded within the constraint-enriched representations, generating trigger identifiers by associating each conditional trigger with an execution priority indicator, determining permissible state adjustments for each trigger identifier by referencing predetermined state-transition rules stored in a transition rulebase, assembling a multi-entry list of state adjustments ordered according to the execution priority indicators, and validating the list by executing a simulated traversal of the state adjustments to detect invalid or cyclic transitions and removing entries that violate traversal correctness constraints.

In one embodiment, the system transforms high-level conditional execution descriptions—extracted earlier from the parsed and constraint-enriched software specifications—into low-level state-adjustment structures that can later be encoded as machine-interpretable blockchain instructions. This mapping process begins by examining the constraint-enriched representation dataset where each functional expression has already been linked with explicit and implicit dependencies. Within this dataset, the system identifies conditional triggers such as "IF sensor load exceeds threshold and privacy-marker≥0.6 THEN increase validation quorum" or "IF cross-domain anomaly detected THEN enforce read-only mode for energy subsystem logs." These triggers appear in a structured graph format, and the mapping module isolates them by scanning for nodes marked with conditional operators, dependency symbols, or multi-branch logic constructs.

For every conditional trigger detected, the system generates a trigger identifier, which serves as a machine-level reference handle to the trigger during state-adjustment mapping. This identifier is not a simple label—it is synthesized by combining the trigger's domain, its hierarchical specification depth, and a computed execution priority indicator. The execution priority is computed using a rule set that weighs several factors: the security-criticality of the underlying condition, the recency of related telemetry deviations, and historical execution latencies of similar triggers. For example, a trigger involving anomalous public-safety sensor fusion may be assigned a higher priority (e.g., priority score 0.91 on a 0-1 scale) compared to a trigger dealing with mild workload fluctuations in street-light energy units (e.g., priority 0.33). This priority determines where the resulting state adjustments will appear in the final execution order.

Once each trigger has an assigned identifier and priority, the system determines which state adjustments are permissible for that trigger. This is not done heuristically but by consulting a formally stored transition rulebase, which contains entries such as:

"If trigger=privacy escalation, allowable transitions include: increase masking depth, restrict cross-node read permissions, enable hashed-field mode."

"If trigger=workload surge, allowable transitions include: reorder block-validation tasks, reduce block size, enable parallel commit mode on selected nodes."

The mapping module uses the trigger identifier to query the rulebase, retrieving only those state transitions that maintain structural coherence with the rest of the system. For example, if a trigger indicates a high anomaly score in transportation telemetry, the rulebase might allow transitions that modify the validation path for all transactions tagged with transport identifiers, but disallow transitions affecting energy-grid consensus pathways to prevent unnecessary cross-domain interference. In this way, the system operationalizes high-level conditions into explicit state adjustments, such as adjustment entries: ("modify_validation_order", priority 0.91, domain=public-safety) or ("restrict_data_handling", priority 0.72, domain=environment).

The system then assembles these permissible transitions into a multi-entry list ordered by the execution priority indicators. The ordering step is critical because blockchain systems require deterministic execution sequences. For example, if a high-priority trigger calls for a validation-control adjustment and a medium-priority trigger calls for a data-handling modification, the former must appear earlier in the list to ensure ledger consistency. In practice, the system performs a priority-based sorting algorithm—such as a stable heap-sort or priority-queue extraction—to generate an ordered list where entries flow from most urgent to least urgent.

After this ordering is complete, the system initiates a simulated traversal to validate the list. This traversal uses a virtual execution environment mirroring the ledger's logical state machine. For every state adjustment entry, the system verifies whether executing it will result in:

1. an illegal transition (e.g., modifying a validation rule that conflicts with a previously applied permission state), 2. a cyclic dependency (e.g., an adjustment that indirectly triggers a condition requiring the original state, creating an infinite loop), or 3. a structural invalidation (e.g., a transition that would violate the domain-execution boundary previously defined during parsing).

As an example, if a privacy-based trigger proposes a transition that reduces read permissions for energy subsystem auditors, but a higher-priority security trigger earlier in the list requires those auditors to validate specific anomaly-tagged data blocks, the simulated traversal identifies this contradiction. The system then removes or modifies the invalid adjustment entry to maintain traversal correctness.

In an embodiment, encoding the state-adjustment structures into the machine-interpretable instruction sequences comprises converting each validated state-adjustment entry into a multi-byte instruction pattern including an operation code portion, an operand portion, and a boundary-check segment, assigning an execution pointer to each instruction pattern by calculating sequential offsets from a base memory address, linking the instruction patterns by setting the pointer of each pattern to the next sequential offset, inserting synchronization markers at predetermined pointer positions corresponding to transitions between subsystem contexts, and generating a contiguous instruction stream by concatenating all pointer-linked instruction patterns.

In this embodiment the processor implements a deterministic compilation pipeline that translates validated, constraint-enriched state-adjustment entries into low-level, machine-interpretable instruction sequences suitable for deployment on distributed ledger nodes, and does so by imposing strict layout, linking, and runtime-safety conventions that together produce predictable, verifiable behavior. The pipeline begins by selecting a canonical binary instruction format that partitions each instruction into at least three semantic segments: an operation-code (opcode) field that uniquely identifies the action to be performed (for example 0xA1 for "adjust-timing", 0xB2 for "raise-quorum", 0xC3 for "mask-field"), an operand block that carries the parameter payload (for example a 32-bit fixed-point value for a new block-interval, or a compact reference index into an on-node parameter table), and a boundary-check segment containing metadata used at runtime to validate preconditions (for example minimum/maximum allowed operand values, an integrity checksum, and a small safety mask indicating which ledger fields are affected). The compiler normalizes numeric types (fixed-point vs integer), enforces endianness and alignment rules, and reserves fixed byte lengths for each segment so instruction sizes are predictable; for example a 1-byte opcode, a 4-byte operand, and a 3-byte boundary segment produce an 8-byte instruction pattern that simplifies pointer arithmetic and buffer allocation on constrained nodes.

For each validated state-adjustment entry the compiler constructs the multi-byte pattern by encoding the action identifier into the opcode field, serializing parameter values into the operand block according to the pre-agreed type encodings, and populating the boundary segment with explicit runtime checks derived from the constraint-enriched specification (for instance, a minimum allowed quorum of 50% and maximum of 95%, or a timestamp validity window expressed as an epoch range). The inclusion of boundary checks as first-class instruction elements produces an immediate technical advantage: nodes can perform a constant-time validation before applying any state change, preventing out-of-range or contextually inappropriate adjustments from corrupting ledger state. Each instruction also carries a small provenance tag—such as a specification identifier and a priority index—so that the runtime can log the origin of applied adjustments for auditability.

Once individual instruction patterns are created the assembler computes execution pointers by calculating sequential offsets from a chosen base memory address. The base address is selected with awareness of node memory layout and alignment constraints; the assembler ensures that pointers are aligned on word boundaries where required by the execution environment, and that pointer arithmetic avoids overflow by reserving safe buffer regions. Linking is implemented by writing the calculated offset of the next instruction into a fixed pointer slot (or by maintaining a compact linked-list header) within each instruction pattern so that at runtime the execution engine can follow pointer links rather than relying solely on fixed-index iteration. This linked layout enables efficient insertion or removal of instruction segments without rewriting the entire stream: to insert a new segment the deployment agent updates the previous instruction's pointer and computes the new segment's pointer atomically, then issues a small atomic commit to the node's instruction-memory region.

To manage transitions between subsystem contexts (for example moving from transportation-related adjustments to energy-related adjustments within the same instruction stream), the assembler inserts synchronization markers at pre-designated pointer positions. These markers are encoded as reserved opcodes or as a special boundary flag within the boundary-check segment and are accompanied by context headers that describe expected runtime invariants—such as "quorum must be stable for 2 subsequent blocks" or "do not apply authorization changes during ongoing database compaction." At runtime the execution engine recognizes synchronization markers and executes a context switch protocol: it first runs the boundary checks for the upcoming segment, waits for any in-flight subsystem operations to quiesce if required, and only then applies the next set of instructions. This mechanism enforces safe ordering across subsystems and reduces risk of race conditions when multiple state adjustments would otherwise contend for the same ledger resources.

The final contiguous instruction stream is produced by concatenating all pointer-linked instruction patterns into a deployable binary blob and then computing a top-level integrity digest and an instruction-stream manifest. The manifest includes the base address, a table of synchronization marker offsets, a version identifier, and a lightweight execution policy (e.g., allowed node roles for execution, maximum retries, and rollback conditions). Before dispatching to nodes, the deployment manager performs a simulated verification pass that traverses pointers, validates boundary constraints statically where possible, detects potential cycles or unreachable segments, and rejects instruction streams that fail these checks. During deployment the node loader performs runtime verification by re-checking the stream manifest digest, validating each instruction's boundary segment against current node state and policy, and applying each instruction atomically-if any boundary check fails, the engine halts execution at the failing pointer, records the failure event, and optionally triggers a fallback instruction sequence encoded in the stream (for example a safe-revert opcode that restores prior ledger parameters).

As a concrete example, a state-adjustment to reduce block interval from 6 s to 4 s is encoded as opcode 0xA1, operand 0x00000004 (seconds), boundary segment {min: 0x00000002, max:0x00000010, checksum:0x9F}; the assembler places this instruction at offset 0x1000, writes the next pointer 0x1008 into the instruction's pointer slot, and inserts a synchronization marker after a batch of transportation-related adjustments to ensure that energy adjustments are not applied until network latency metrics are within accepted ranges. The node's execution engine reads the instruction, verifies that current network latency is <=marker threshold and that 4 s lies within [2 s, 16 s], then commits the new timing value; if verification fails the engine refuses the commit and logs the detailed provenance for operator review. This pattern of explicit encoding, pointer linking, synchronization, and runtime boundary checks supplies strong technical effects: it enables safe, auditable, and atomic modification of ledger behavior in live distributed environments, reduces the chance of inconsistent partial updates, simplifies failure recovery by localizing rollback points, and permits formal analysis and verification of the instruction stream prior to live deployment-capabilities that substantially advance practical, automated adaptation of blockchain ledgers driven by telemetry and AI analysis.

In an embodiment, deploying the machine-interpretable instruction sequences across distributed processing nodes comprises generating node-specific deployment descriptors that include capability indicators, memory availability values, and execution limits, transmitting each instruction sequence with its associated descriptor to a selected node, issuing an activation directive upon confirming the node's capacity through the descriptor, collecting execution telemetry including node-processing-time measurements, propagation-delay indicators, memory-usage values, and boundary-check results, and storing the execution telemetry in a telemetry matrix used by the AI-based analytical sequence for recalculating internal representation values.

During execution, the node emits execution telemetry, which forms a critical feedback mechanism for adaptive ledger behavior. This telemetry includes precise measurements of node-processing-time per instruction segment, propagation delays encountered during inter-node communication, peak and average memory usage during execution, and boundary-check flags that indicate whether any instruction exceeded its permitted operational limits. For example, if Node A reports a processing-time measurement of 11.6 ms for a validation-control adjustment instruction, but Node B reports 6.2 ms for the same instruction, the system can infer differences in node efficiency or workload distribution. Moreover, if a boundary-check result indicates that a memory threshold was exceeded during instruction execution at any node, the system flags this as a deviation requiring immediate analytical review.

All collected telemetry is then assembled into a telemetry matrix, a structured multi-dimensional dataset indexed by node identifier, instruction pointer position, and execution timestamp. This telemetry matrix is streamed back into the AI-based analytical sequence, which processes it alongside incoming smart-city telemetry to update the internal representation values. For instance, if propagation-delay indicators consistently rise beyond expected limits, the analytical sequence may interpret this as a workload progression pattern or a potential synchronization defect, causing updated representation values to reflect heightened workload sensitivity or network inefficiency. These updated representation values then influence the next cycle of ledger-configuration selection, forming a continuous loop of instruction deployment, execution monitoring, analytical recalculation, and behavioral adaptation.

In an embodiment, modifying the ledger-configuration fields comprises computing updated internal representation values from the normalized execution telemetry by reprocessing the telemetry through the AI-based analytical sequence, deriving adjustment indicators by comparing the updated representation values with a previously stored representation set, selecting a ledger-configuration field whose current entries diverge from the adjustment indicators beyond stored deviation thresholds, calculating a new field value by applying a proportional modification rule derived from the adjustment indicators, and overwriting the ledger-configuration field with the new field value for use in subsequent execution cycles.

In this embodiment the processor implements a closed-loop, telemetry-driven configuration update routine that turns raw node execution telemetry into deliberate, auditable changes to ledger configuration fields by reprocessing execution telemetry through the same AI-based analytical sequence used to form the original internal representations, comparing the newly produced representation arrays to stored baseline patterns, and applying mathematically defined adjustment rules that ensure stability, safety, and convergence. The routine begins by normalizing the execution telemetry—scaling timing, delay, and resource metrics to canonical units, clipping outliers using winsorization or median-based filters, and producing time-aligned telemetry slices that match the temporal indexing used by the original representation arrays—so that the analytical layers receive data in the exact format and orientation they expect. The normalized telemetry is then fed forward through the layered transformation workflow (the same sequence of weighted layers and activation functions described previously) to yield updated internal representation values; these updated arrays may include security-anomaly indicators, privacy-sensitivity weights, and workload-progression markers, each tagged with a confidence score derived from layer-level variance and recent pattern-matching quality. To derive adjustment indicators the system computes a difference metric between the updated representation and a previously stored representation set using one or more quantitative distance measures (for example an L2 norm for magnitude differences combined with a cosine similarity score for directional shifts) and annotates each representation-dimension with a deviation magnitude and confidence. The selection of ledger-configuration fields to change is performed by mapping representation-dimensions to linked configuration fields via the stored linkage table (for example mapping a rising anomaly vector to validation-control quorum, or rising workload-progression to timing-control/throughput parameters), then applying deviation thresholds: only fields whose mapped deviation magnitude exceeds a configured threshold and whose confidence score surpasses a minimum acceptance level are eligible for modification, preventing noisy telemetry from causing spurious updates. For each eligible field the new field value is computed using a proportional modification rule that blends the current field value with a target implied by the adjustment indicator; concretely, the rule may take the form new=clip(current+ $\alpha$*(target−current), min_allowed, max_allowed) where $\alpha$ is an adaptive step-size computed from the confidence score and the deviation magnitude (for example $\alpha$=base_lr*sigmoid(confidence)*min(1, deviation/ m_scale)), and clipping enforces hard operational bounds taken from the constraint-enriched specification. The target itself can be computed in several robust ways—direct mapping from a calibrated lookup table, interpolation from past successful updates, or as a small projected step toward a steady-state solution computed by solving a constrained least-squares fit between representation patterns and historically successful configuration vectors—allowing the embodiment to support both conservative incremental changes and larger corrective steps when telemetry shows high-confidence, large-magnitude divergence. Before committing any overwrite the processor executes inter-field consistency checks (reapplying the same inter-field constraints used during mutation generation to ensure, for example, that reducing block interval does not force quorum below a feasible value) and runs a simulated dry-run applying the candidate new value against a fast node model to confirm no immediate violation of timing or validation invariants; the update is then packaged into a transaction-like manifest describing the prior value, proposed value, deviation evidence, confidence, and provenance, and published to a configuration-change queue where a two-stage commit protocol performs an atomic swap on the live configuration (write-ahead logging plus an ability to atomically roll back to the prior field value if a runtime boundary-check encoded in the instruction stream later fails). To reduce oscillation and ensure convergence the embodiment includes temporal smoothing (exponential moving average of recent computed new values), hysteresis thresholds that prevent toggling when deviations oscillate near the acceptance threshold, and adaptive back-off (reducing a after a failed update or repeated rapid updates). For example, if a previously stored representation set showed a validation-quorum of 70% while updated representations indicate amplified anomaly indicators shifting from 0.2 to 0.8 (on a 0-1 scale) with high confidence, the proportional rule might compute a target quorum of 88% and then apply new=70%+0.5*(88%−70%)=79% (clipped and validated against max allowed), log the rationale, and deploy the change atomically; the system then monitors subsequent execution telemetry to confirm expected reduction in anomaly propagation and, if necessary, continues iterative refinement until the internal representations return within acceptable bounds. The technical effect of this embodiment is a reliable, mathematically grounded feedback mechanism that turns distributed execution signals into safe, auditable, and convergent ledger-configuration adaptations—improving responsiveness to real-world conditions while preventing instability, ensuring policy compliance through constraint checks, and providing traceable evidence for each automated change.

In an embodiment, modifying the instruction-sequence ordering comprises computing load-intensity values from updated internal representation values, identifying instruction segments having high load-sensitivity scores by comparing the instruction segments to the load-intensity values, generating a reordering index for each load-sensitive segment, adjusting pointer offsets of the load-sensitive segments according to the reordering indices, and producing a reordered instruction stream with updated pointers that reflect the revised execution order.

In this embodiment the processor executes an automated, data-driven reordering pipeline that translates AI-derived load signals into a safely rearranged instruction stream by first computing quantitative load-intensity metrics for each instruction segment and then using those metrics to produce a conflict-aware, pointer-updated ordering that preserves correctness and minimizes execution bottlenecks. The routine begins by deriving a load-intensity vector from the updated internal representation values—for example a numeric score per time interval that aggregates node CPU utilization, propagation-delay sensitivity, and validation-latency impact into a single scalar (computed as a weighted sum, e.g., load=w_cpu·CPU+w_delay·delay+w_val·validation_latency normalized to [0,1])—and storing these values in a time-indexed array. Concurrently the assembler maintains a segment-metadata table for the existing instruction stream where each entry records segment identifier, affected ledger fields, estimated execution-cost, current pointer offset, synchronization marker positions, and dependency links (read/write sets and precedence constraints). The system computes a load-sensitivity score for each segment by comparing its metadata (especially estimated execution-cost and field contention profile) against the load-intensity vector using a matching function (for example segment sensitivity=max_t{load(t)·overlap(segment,time_window_t)}), and flags segments whose sensitivity exceeds a configurable sensitivity threshold. For flagged segments the processor generates reordering indices by solving a constrained optimization that balances improving execution latency (moving high-sensitivity segments earlier or grouping them to reduce context switches) against preserving logical dependencies and synchronization requirements; in practice this is implemented by constructing a weighted dependency graph where nodes are segments, directed edges encode hard precedence or data conflicts, and node weights equal the negative of sensitivity (to prefer high-sensitivity segments), then performing a topological sort that respects edge constraints while using a priority queue to break ties in favor of higher-sensitivity nodes—this yields deterministic reordering indices that avoid cycles and respect atomicity. Pointer offsets are recalculated deterministically from the new ordering by computing new sequential offsets from the base address while preserving alignment rules and reserved synchronization slots; where the instruction layout uses explicit pointer slots, the assembler updates only the pointer fields of affected predecessor segments and writes them atomically (for example via a two-phase update that first writes new pointers to a staging area and then atomically swaps a base pointer), thereby minimizing the number of memory writes and ensuring that partially applied reorders cannot leave the stream in an inconsistent intermediate state. Before finalizing the reordered stream the pipeline runs static checks and a simulated dry-run that validates boundary-check segments, ensures synchronization markers remain correctly positioned relative to affected subsystem contexts, and verifies that no dependency edge is violated by the new ordering; if the dry-run detects an unsafe condition (for instance, a validation-step now preceding a required state-initialization), the system either applies conflict resolution rules that reinsert required segments or falls back to a conservative ordering that preserves original pointers for the problematic subset.

In an embodiment, characterizing security-relevant deviations in the AI-based analytical sequence further comprises isolating anomaly signatures by computing inter-interval deviations of telemetry values, assigning anomaly scores to fields whose deviations surpass reference thresholds stored in a security-state library, propagating the anomaly scores through the weighted computational layers to produce amplified anomaly indicators, and embedding the amplified anomaly indicators into the internal representation values for configuration-set evaluation. This begins with the computation of inter-interval deviations, where the system compares fused multi-field telemetry vectors across consecutive time intervals. For example, if a transportation vector for time/ includes [vehicle_speed_variance=0.12, occupancy_index=0.44] and the vector for time t+1 jumps to [0.63, 1.20], the deviation engine computes a per-field delta—here, +0.51 for speed variance and +0.76 for occupancy. Similar deviations are computed across the energy, public-safety, and environmental telemetry. These deviations reflect "instantaneous system changes" and serve as raw indicators of possible malicious manipulation, such as spoofed environmental readings or injected anomalies in public-safety sensor flows.

Once these inter-interval deviations are computed, the system evaluates whether they exceed reference thresholds stored in a security-state library. The library is a structured dataset containing historical deviation envelopes, adversarial behavior signatures, and predicted abnormal fluctuation ranges. For instance, under normal conditions, the energy grid load deviation may remain within ±0.30 between intervals, but a coordinated attack on smart meters might cause the deviation to surge to +1.50. When such a deviation is detected, the deviation engine assigns an anomaly score proportional to both the magnitude of deviation and its contextual risk weighting. A score may be computed using a formula such as:

$$anomaly\_score = magnitude \times risk\_weight \times pattern\_alignment\_factor.$$

If an environmental subsystem manifests a sharp spike in particulate count (+0.92) and that field has a high risk weight due to its linkage to air-quality alert systems and potential cyber-physical exploitation, the anomaly score for this field may reach values such as 0.81 on a normalized 0-1 scale. These anomaly scores are then propagated into the weighted layers of the AI-based analytical sequence. Propagation is not a simple insertion—it involves amplifying the influence of high-severity deviations so that deeper layers learn to respond more aggressively to security-critical conditions. For example, the anomaly scores may be injected into the first computational layer as additive bias values, causing downstream layers to reflect heightened sensitivity. Alternatively, the scores may dynamically scale certain weight matrices to emphasize threat-linked pathways; for instance, if transport anomalies and energy anomalies appear simultaneously, the system increases inter-layer coupling weights to model coordinated attacks. As the signal moves deeper through successive layers, non-linear activation functions (e.g., ReLU, tanh, GELU) generate amplified anomaly indicators that highlight cross-domain relationships. For example, if an anomaly in public-safety telemetry consistently co-occurs with an energy-grid fluctuation, the system generates a combined anomaly indicator that exceeds the sum of individual deviations, allowing the AI engine to capture multi-domain attack patterns rather than isolated outliers.

In an embodiment, computing privacy-relevant sensitivity indicators within the AI-based analytical sequence comprises detecting data fields that exhibit repeated or identity-indicative access patterns by measuring access frequency, comparing the access frequency with stored privacy-constraint limits, calculating sensitivity scores from the comparison results, propagating the sensitivity scores through subsequent layers of the analytical sequence, and tagging state-adjustment entries whose mapped fields exceed the sensitivity scores with masking identifiers used during instruction encoding.

In this embodiment the AI-based analytical sequence computes privacy-relevant sensitivity indicators through a precise, auditable pipeline that transforms raw access events into concrete masking decisions: first, the processor instruments telemetry sources and access logs to produce time-windowed access vectors for each data field (for example user-ID, device-mac, video-frame-hash, or location-tile) by aggregating events into sliding windows (e.g., 1-minute windows with 30-second hop) and counting distinct accessors, access frequency, and access dispersion across node identities; next, the system computes a set of raw privacy metrics per field—including normalized access frequency (events per window divided by a baseline rate), uniqueness score (fraction of accesses that contain identifying tokens versus generic labels), and entropy-based exposure score (Shannon entropy over accessor identity distribution)—and then compares those metrics against policy-defined privacy-constraint limits stored in the constraint-enriched specification dataset (for instance a rule that any field with normalized frequency >0.8 and uniqueness score >0.6 is high-sensitivity). From these comparisons the pipeline calculates a sensitivity score using a weighted combination (for example $sensitivity = w\_f \cdot norm\_freq + w\_u \cdot uniqueness + w\_e \cdot (1 - normalized\_entropy)$), and attaches a confidence value derived from recent variance in the metric stream and the completeness of access-log data; fields with sensitivity above configurable thresholds are flagged for protective action. The flagged sensitivity scores are then propagated forward through the analytical layers exactly as other internal representation values-they are combined with security anomaly indicators and workload markers during the formation of state-adjustment candidates so that privacy concerns influence ledger-configuration and instruction choices rather than being an afterthought. When mapping state-adjustment entries to instruction encodings the system deterministically tags those entries whose mapped fields exceed the sensitivity threshold with masking identifiers and encoding directives (for example MASK_TYPE=hash256_saltX, MASK_LEVEL=k_anonymity:10, or MASK_ROUTE=offchain_ref) which instruct the instruction-construction stage to emit masking opcodes, to reference on-node pseudonymization tables, or to route raw values to an off-chain vault while placing only a token on-chain. Concretely, if an access analysis shows that user-id in transportation telemetry is accessed by 12 distinct analytics services within the last minute and yields a uniqueness score of 0.78, the pipeline might compute sensitivity=0.85 and tag any state-adjustment entry that would write user-id to the ledger with MASK=HASH_SALT 0x1A and insert a precondition in the instruction boundary-check requiring node-side verification of the masking operation before commit. Runtime enforcement is supported by instruction boundary segments that include the required masking identifier, and nodes perform an atomic check that the masking was applied (for example verifying a hash prefix or a k-anonymity bucket index) before accepting the instruction; failures cause the instruction to be rejected and generate a provenance log entry for audit and potential human review. To avoid unnecessary masking overhead, the embodiment implements hysteresis and temporal smoothing (a field must sustain sensitivity above threshold for N consecutive windows before a mask tag is applied) and supports graded masking strategies (lightweight tokenization when sensitivity is borderline, stronger cryptographic masking for high-sensitivity) so that system performance and privacy trade-offs are tunable. The technical effect is that privacy considerations become first-class inputs to ledger adaptation: the AI pipeline quantitatively detects identity-indicative exposure, translates it into verifiable masking directives, and ensures instruction streams carry the exact runtime checks necessary to protect sensitive data while preserving auditability and deterministic behavior—enabling safe, policy-compliant ledger operation in privacy-sensitive smart-city deployments.

In an embodiment, extracting scalability-relevant workload progressions comprises computing sequential load increments by comparing fused telemetry vectors from adjacent time intervals, determining escalation magnitudes by identifying intervals where the load increments exceed an escalation boundary stored in a scalability reference set, propagating the escalation magnitudes through the analytical layers to generate workload progression indicators, and integrating the workload progression indicators into the internal representation values that influence selection of the ledger-configuration set.

In one embodiment, the system analyzes workload-related scalability patterns by computing how the fused telemetry evolves from one interval to the next. This process begins with the system receiving synchronized fused telemetry vectors—each containing normalized parameters derived from transportation, energy, public-safety, and environmental inputs—and performing a sequential comparison across adjacent time intervals.

Once increments are computed, the system examines whether they cross predefined escalation boundaries stored in a scalability reference set. This reference set contains statistically derived escalation thresholds based on historical city behavior, simulated peak-load conditions, and anticipated stress scenarios (e.g., festival days, power grid maintenance windows, or emergency responses). For instance, the reference set may specify that an increment above +0.18 in traffic density or above +0.12 in grid load corresponds to the onset of scalability pressure. In the example above, both the +0.21 traffic increment and the +0.16 grid load increment exceed their respective thresholds. The system therefore identifies this interval as a scalability escalation event, marking it as a potential precursor to network congestion, blockchain transaction surges, or sensor aggregation bottlenecks.

After identifying escalation events, the system transforms the raw escalation magnitudes into deeper analytical signals by propagating them through multiple layers of the AI-based analytical sequence. The propagation step allows the system to interpret not only the magnitude of the workload increase but also the correlation between escalations across domains. For instance, a simultaneous rise in transportation activity and power demand often precedes a surge in blockchain-related data submissions such as vehicle credentials, microgrid energy trades, or safety-related notarizations. The analytical engine amplifies such correlated escalations using weighted transformations, where weights reflect learned cross-domain dependencies. A rapid increase in grid load that historically accompanied city-wide events may be amplified more aggressively than isolated fluctuations. Activation functions in subsequent layers (e.g., tanh, ReLU, or leaky ReLU) generate workload progression indicators that express both immediate and projected workload intensities.

These workload progression indicators form a structured vector—for example [0.44, 0.52, 0.81]—representing mild, moderate, and high-impact progression channels. The last value, 0.81, might indicate that the current escalation trend resembles patterns preceding previously documented high-volume blockchain transaction bursts. These progression indicators are then integrated into the internal representation values that govern the ledger-configuration selection process. This integration step ensures that the configuration-evaluation module interprets not only static telemetry or individual anomalies but also multi-interval workload acceleration dynamics. For instance, if the workload progression vector indicates a sustained rise, the evaluation unit may prioritize configuration sets featuring reduced block-processing intervals, increased validator parallelism, or dynamic reallocation of computation-intensive tasks to high-performance nodes.

In an embodiment, generating the fused multi-field records in the organized digital structure further comprises computing subsystem-balance weights across transportation, energy, public-safety, and environmental categories, applying the subsystem-balance weights to normalize each subsystem's contribution to the fused record, inserting subsystem-correlation values that reflect correlation strength among the categories, and storing the normalized fused records as entries in the unified structure.

In this embodiment the processor augments the fused multi-field record creation with a systematic, quantitative balancing step that prevents any single subsystem from dominating the fused representation and that encodes explicit inter-subsystem relationships for downstream analytics: the routine first computes lightweight reliability and contribution metrics for each subsystem (for example a reliability score derived from recent missing-value rate, timestamp jitter, and sensor variance; a freshness score derived from time-since-last-sample; and a dynamic importance score derived from rule metadata or current operational mode), then converts those metrics into subsystem-balance weights using a numerically stable transform such as a temperature-controlled softmax over the product of inverse variance and reliability (e.g., $\text{weight\_i}=\text{softmax}((\text{reliability\_i}/(\text{variance\_i}+\varepsilon))/\tau)$), with $\tau$ chosen to control how sharply the largest contributors dominate; these weights are normalized to sum to one and stored with high precision so the fusion is reproducible. The processor then applies the weights to normalize each subsystem's contribution to any shared fused field by computing weighted combinations (for scalar fields a weighted sum, for vector fields a weighted concatenation with per-position scaling, and for categorical markers a confidence-weighted voting scheme), and an illustrative numeric example would be: transportation contribution=30 (units), energy=1200, public-safety event score=0.4, environmental AQI=180 with computed weights [0.40, 0.30, 0.20, 0.10] producing a normalized composite metric through per-field mapping (e.g., $\text{normalized\_value}=0.40\cdot\text{norm}(30)+0.30\cdot\text{norm}(1200)+0.20\cdot\text{norm}(0.4)+0.10\cdot\text{norm}(180)$ where $\text{norm}(\cdot)$ rescales each domain into a consistent unit space). Simultaneously the pipeline computes subsystem-correlation values over a sliding window (Pearson correlation for near-linear relationships, rank-correlation or mutual information where nonlinear coupling is suspected) and stores both short-window and long-window coefficients plus a significance score so correlation strength is explicit rather than implicit; for example a Pearson $r=0.82$ between transportation congestion and energy load over the last 10 minutes would be recorded along with p-value and sample size to guide confidence. The fused record written to the unified, time-indexed structure therefore contains not only the normalized, weighted field vector but also the exact weight vector, the correlation matrix entries for that time slice, provenance metadata (source timestamps, reliability inputs, interpolation flags), and a version tag for the weighting policy. Practically, the embodiment enforces smoothing and stability via temporal regularization (exponential moving averages on weights, minimum dwell times before weight changes take effect), fallback rules that set default balanced weights when one or more subsystems are offline, and consistency checks that clip extreme normalized contributions to avoid numerical instability; complexity is linear in the number of subsystems and fields per time slice and the operations are amenable to streaming execution for low latency.

In an embodiment, updating internal representation values using execution telemetry comprises generating telemetry slices from raw telemetry logs, assigning slice identifiers based on elapsed operational intervals, converting each slice into a standardized record through time scaling and unit normalization, feeding the standardized records into the analytical layers to generate updated representation patterns, and merging each updated representation pattern with a stored pattern set by applying a progressive weighting schedule.

In one embodiment, the system incorporates execution feedback from blockchain nodes to continually refine the internal representation values generated by the AI-based analytical sequence, ensuring that ledger behavior remains aligned with real-time operational performance. This process begins by retrieving raw execution telemetry logs, which may include per-node processing durations, block-validation latencies, memory consumption trends, boundary-check signals, and aggregated propagation delays between nodes. Because these logs are collected asynchronously from distributed nodes, the system first converts them into telemetry slices—discrete segments representing execution behavior within defined operational intervals. For example, a slice may correspond to all telemetry recorded in a 1-second execution window across all participating nodes. Each slice is assigned a slice identifier computed from a monotonically increasing interval counter, ensuring that slices are chronologically trackable regardless of the node from which they originated.

Once slices are identified, the system must standardize them because telemetry values from different nodes vary in scale, sampling rate, and magnitude. To accomplish this, the system converts each slice into a standardized record using two stages: time scaling and unit normalization. Time scaling aligns records from nodes whose sampling periods differ; for instance, if Node A samples latency every 10 ms and Node B every 40 ms, the system interpolates Node B's values to match Node A's temporal granularity. After alignment, unit normalization scales telemetry to consistent ranges. For example, memory usage may be normalized to a 0-1 range using (value−min)/(max−min), while boundary-check flags are encoded as binary or soft-encoded confidence values. This normalization ensures that subsequent analytical layers interpret telemetry uniformly, without bias from differing raw measurement scales.

Each standardized record is then introduced back into the analytical layers that produced the original representation values. This reprocessing step allows execution telemetry—not just incoming smart-city telemetry—to influence the internal representation patterns. As the record enters the first analytical layer, weighted transformations adjust the signal to encode whether nodes are processing instructions within acceptable limits. For instance, if the normalized propagation delay exceeds typical thresholds learned during earlier training cycles, the first layer may increase the activation values associated with workload pressure. In deeper layers, recurrent or feedforward structures generate updated representation patterns that incorporate both performance deviations and structural relationships between node behaviors. For example, if multiple nodes show consistent memory strain while executing a specific instruction segment, deeper layers may interpret this as a systemic scalability risk and produce a heightened workload progression indicator.

After each updated representation pattern is produced, the system merges it with a stored pattern set that reflects historical internal representations from prior cycles. The merging operation uses a progressive weighting schedule, rather than simple averaging, to balance responsiveness with stability. A progressive weighting schedule assigns higher influence to more recent execution patterns while gradually decaying the weight of older ones. For example, the system might apply weights such as: 0.65 for the newest pattern, 0.25 for the second most recent pattern, and 0.10 for older stored patterns combined. This ensures that sudden but legitimate operational changes—such as a spike in transaction submissions or a momentary reduction in node capability—quickly influence the internal representation values. Meanwhile, transient anomalies or noise do not dominate the system's decision-making. The merged representation array therefore becomes a smoothed but time-sensitive indicator of both the city's operational environment and the blockchain network's execution behavior. The technical advancement introduced by this embodiment is the unification of blockchain execution telemetry with AI-based representation learning. Existing blockchain systems lack mechanisms to incorporate runtime performance feedback into their configuration logic, resulting in static or manually tuned behavior that cannot adapt to execution inefficiencies. By merging updated representation patterns through a progressive weighting schedule, the invention enables long-term adaptive learning while preventing instability or oscillation in configuration changes. This results in a self-correcting, performance-aware ledger capable of optimizing both throughput and reliability in a large-scale smart-city deployment.

In an embodiment, adjusting instruction-sequence ordering based on the execution telemetry comprises computing new execution-order weights for each instruction segment from updated representation patterns, assembling a weighted dependency graph among instruction segments, executing a topological sorting procedure on the weighted graph to derive an optimized execution sequence, and rewriting the pointer offsets of the instruction stream according to the optimized execution sequence.

In this embodiment the processor converts raw execution telemetry into concrete ordering decisions by running a deterministic, constraint-aware optimization pipeline that computes execution-order weights from updated internal representation patterns, builds a weighted dependency graph, derives a dependency-respecting optimized sequence via a priority-aware topological sort, and then safely rewrites pointer offsets so the live instruction stream reflects the new order without violating correctness or atomicity. Concretely, the pipeline begins by mapping updated internal representation values (for example load-progression indicators, latency trend features, and recent boundary-failure counts) into scalar execution-order weights for each instruction segment using a calibrated scoring function; this function typically combines normalized representation components with learned or policy-driven coefficients (e.g., weight_s=$\beta 1 \cdot$load_score+$\beta 2 \cdot$latency_impact+$\beta 3 \cdot$anomaly_score, normalized to [0,1]) and may include a temporal decay term so recent telemetry has larger influence. Next the processor assembles a directed dependency graph in which nodes represent instruction segments and edges encode hard precedence or resource-conflict constraints (for instance "initialize state X before validating Y" or "authorization update A must not follow data-write B"), and attaches the computed weight to each node as a scheduling priority. To derive an optimized execution order that respects these constraints, the routine executes a modified Kahn-style topological sort that uses a priority queue: nodes with zero incoming edges are inserted into the queue and popped in descending order of weight so that among all currently available (dependency-free) segments the scheduler places higher-weighted segments earlier in the output sequence while still preventing violation of any directed edge. If the graph contains cycles the system invokes a deterministic cycle-resolution procedure that consults the constraint-enriched specification (preferring higher-priority constraints), temporarily groups strongly-coupled segments into atomic super-nodes, or issues a constrained local reordering that preserves atomicity and semantic correctness; all cycle-resolution decisions are recorded with provenance metadata. Once the ordered list of segments is produced the assembler computes new pointer offsets by laying out segments sequentially subject to alignment and reserved-sync constraints, recalculating offsets deterministically (for example base+$\Sigma$previous_segment_lengths) and updating pointer fields only for instructions whose successors changed, minimizing memory writes. To preserve runtime safety the embodiment uses an atomic switch strategy: the new instruction stream is written to a staging buffer, the manifest (including updated pointer table and a digest) is verified, and an atomic pointer swap (or an atomic update of the base pointer) flips execution to the new stream; if the environment does not support atomic base-pointer swaps, the system instead updates pointer slots using a two-phase commit that first writes new pointers to a protected staging area and then flips a single committed flag. Before flipping, a simulated dry-run is performed against a fast node model that replays the new ordering with current node-state snapshots and boundary-check predictions to detect any order-dependent violations (for example a validation step that would now precede required state initialization); if the dry-run fails, the pipeline either revises the ordering using tie-breaker back-off rules or aborts the reorder and logs the cause. After deployment the system continuously monitors post-reorder telemetry and computes an improvement score (for latency reduction, throughput increase, or reduced boundary-check failures); if the reorder yields negative impact beyond a rollback threshold, an automated revert uses the preserved prior manifest to restore the original offsets atomically. As an illustrative numeric example, suppose segments S1-S4 have computed weights [0.92, 0.45, 0.78, 0.30] and dependencies S2→S3 (S2 must precede S3) and S1→S4; the priority-topological algorithm will schedule available nodes respecting dependencies while promoting S1 and S3 earlier (yielding order S1, S2, S3, S4 after cycle checks and grouping if necessary), recalculate offsets (e.g., S1@0x3000, S2@0x300C, S3@0x3018, S4@0x3024), update pointer slots atomically, and publish a manifest noting the weight vector, ordering rationale, and provenance for audit. Performance optimizations include incremental recomputation of only affected subgraphs when telemetry changes locally (rather than rebuilding the entire graph), memoization of previously resolved orders for similar weight patterns, and complexity control via pruning of low-impact segments from reordering consideration during high-frequency update windows. The technical effect of this embodiment is to provide a provably-safe, auditable, and low-latency mechanism for turning telemetry-driven representation updates into dependency-aware reordering of instruction streams that reduces execution hotspots, minimizes contention, and does so with atomic updates, simulation validation, and automated rollback paths—capabilities that materially enable adaptive, high-confidence ledger behavior in distributed smart-city deployments.

In an embodiment, modifying ledger-configuration fields based on updated internal representation values comprises identifying configuration deviations by detecting mismatches between updated representation patterns and stored field values, determining the magnitude of deviation for each mismatching field, computing a corrective field value by applying a deviation-based adjustment factor, and replacing the mismatching field value with the corrective field value before generating the next configuration cycle.

In one embodiment, the modification of ledger-configuration fields is realized as a closed-loop adjustment mechanism that directly maps updated internal representation values to concrete configuration changes in the blockchain ledger. Once the AI-based analytical sequence produces updated representation patterns, the system first compares these patterns to a stored snapshot of the currently active ledger-configuration fields. Each configuration field—such as block-interval targets in the timing-control field, quorum thresholds in the validation-control field, role-weight parameters in the authorization-control field, or masking depth parameters in the data-handling-control field—is associated with one or more dimensions of the internal representation array. For example, a validation-control field that determines the minimum number of validating nodes for block finalization may be linked to security anomaly indicators and workload progression indicators in the representation space. The system performs a structured alignment between these linked representation dimensions and the corresponding stored field values, and when the updated representation pattern for a given dimension differs from what the configuration value implies, the system flags this situation as a configuration deviation.

After identifying these deviations, the system quantifies their severity by computing a deviation magnitude for each mismatching field. This magnitude is not merely the arithmetic difference between values; instead, it may incorporate scale normalization and importance weighting. For instance, if the updated security-representation component suggests that the anomaly intensity has increased from 0.35 to 0.78 on a normalized 0-1 scale, and the current validation-control field corresponds to a low-security setting (for example, a validator quorum equivalent to anomaly intensity of 0.40), the system calculates a deviation magnitude that reflects both the absolute difference and the sensitivity of that field to security fluctuations. A deviation magnitude near 0.38 might be derived, representing a substantial underestimation of security risk in the active configuration. Similarly, if workload-related representation patterns show that block-volume progression is rising while timing-control fields still reflect a low-load regime, the deviation magnitude for the timing-control field becomes positive, indicating that current block intervals or batch sizes are too relaxed for the present conditions.

To compute a new configuration value, the system applies a deviation-based adjustment factor that converts this magnitude into a concrete parameter correction. This adjustment factor may be implemented as a proportional gain, possibly combined with damping terms to prevent oscillatory behavior across successive cycles. As an example, the system can compute a corrective quorum threshold by adding a scaled fraction of the deviation magnitude to the current field value, such as new_quorum=current_quorum+(k×deviation), where k is a gain coefficient tuned during design or training. If the current quorum is 5 validators and the deviation magnitude implies a substantial security elevation, the system might compute a new quorum of 7 or 8 validators, depending on the gain and domain constraints. Similarly, if the workload representation indicates sustained surges, the timing-control field may be adjusted by lowering the block-interval duration or altering the maximum block size, again through a deviation-scaled correction formula that moves the configuration toward the representation-implied optimum while respecting allowed operational bounds.

Once the corrective field value is computed, the system replaces the mismatching field in the active ledger-configuration set with the new value before initiating the next configuration cycle. The replacement is written into a configuration store that is referenced by the blockchain execution engine when generating or validating subsequent blocks. This means that, in the very next operational iteration, the ledger uses updated timing, validation, authorization, or data-handling parameters that reflect both the latest smart-city telemetry and the most recent execution telemetry. The technical effect of this mechanism is that the ledger never remains "stuck" in an outdated configuration state; instead, it continuously nudges its operating parameters in the direction implied by evolving internal representation patterns, thereby maintaining alignment between the ledger's behavior and the system's security, privacy, and scalability needs.

In an embodiment, deriving the internal representation values includes computing domain influence distributions by comparing contributions of transportation, energy, public-safety, and environmental categories within the fused telemetry vectors, adjusting the domain influence distributions by applying a balance-index calculation, and storing the resulting domain-balanced representation values for use in configuration evaluation. Concretely, the routine begins by extracting per-domain contribution vectors from every fused multi-field record: for scalar fields this is the raw or normalized measurement (e.g., vehicle count, kW load, incident-score, PM2.5), for vector fields it is a domain subvector, and for categorical fields it is a confidence-weighted indicator; each contribution is converted to a common numeric space via unit normalization (e.g., min-max or z-score normalization using sliding historical windows) so comparisons are meaningful. The processor then computes a contribution summary per time slice by aggregating each domain's normalized components into a single domain-contribution scalar (for example by summing absolute normalized magnitudes or by computing an L2 norm of the domain subvector) and records an auxiliary reliability factor derived from provenance metadata (recent missing-value rate, interpolation flags, and timestamp jitter) so unreliable sources are down-weighted. A balance-index is then calculated to adjust raw contributions into domain influence weights: the index applies a tunable transform such as a temperature-controlled softmax over the reliability-scaled contributions (e.g., $weight\_i = softmax$ $(contribution\_i \cdot reliability\_i / \tau)$), optionally blended with a policy bias vector that encodes domain priorities (for example during emergency modes public-safety receives a higher baseline bias). To avoid transient dominance and oscillation the pipeline enforces temporal regularization—weights are smoothed using an exponential moving average with a configurable decay and a minimum dwell time before a weight change is considered effective—and extreme contributions are clipped to preconfigured bounds to preserve numerical stability. The system then composes the domain-balanced representation by multiplying the original fused field vector by the computed weight for each domain and concatenating the weighted domain components into a single representation array; additionally the representation stores the raw weight vector, reliability scores, and a correlation confidence term that quantifies cross-domain coupling for the same slice (for example a short-window Pearson r or mutual information score that the AI layers can use to detect co-causal events). As a concrete numeric example: given normalized domain contributions [T=0.6, E=2.4, P=0.2, V=1.0] and reliability factors [0.9,0.7,0.95,0.8], the softmax with $\Sigma=1$ applied to the product yields weights approximately [0.18,0.47,0.12,0.23]; these weights scale their domain subvectors, producing a representation in which energy's high raw magnitude is tempered by lower reliability while transportation's moderate magnitude is amplified by high reliability—preventing a single noisy high-volume stream from dominating the learned features. The resulting domain-balanced representation is serialized into the representation array with versioned metadata and an audit token so downstream configuration-evaluation units can deterministically map particular representation dimensions to ledger fields; for instance, a domain-balanced spike in the public-safety component will raise the score dimension that maps to validation-control escalation, whereas a sustained energy-dominant pattern will increase the workload-progression indicators that bias timing-control adjustments. To preserve traceability and enable offline analysis, the embodiment logs the raw contributions, computed weights, smoothing parameters, and the policy bias used for each calculation; it also supports backtesting by replaying historical fused records through alternate t or bias settings to demonstrate why a particular configuration decision followed from specific domain influences. The technical effect of this embodiment is that internal representations explicitly reflect both the quantitative magnitude and the operational reliability of each domain's signals, producing more stable, explainable, and policy-aware inputs to ledger-configuration selection and improving the system's ability to make safe, domain-sensitive adaptations in heterogeneous smart-city environments.

In an embodiment, generating blockchain ledger behavior instructions from the software-engineering specifications further comprises computing domain-context mappings by associating each specification segment with a specific smart-city domain, adjusting the state-adjustment structures to reflect the associated domain-context mappings, modifying pointer configurations to enforce domain-based execution boundaries, and embedding the domain-context mappings into the encoded instruction sequence for execution by distributed processing nodes. The implementation first annotates each parsed specification segment with domain tags and contextual metadata (such as domain identifier, expected data schemas, and typical activation windows) and uses these annotations to adjust previously-created state-adjustment structures so that every proposed state change carries domain-aware constraints and parameters. To ensure safe execution boundaries at runtime, the encoding phase modifies pointer and offset configurations so that instruction streams are logically partitioned by domain: pointer values and synchronization markers are calculated to create contiguous subranges in memory or in the instruction stream that are designated for transportation-related adjustments, energy-related adjustments, etc., and each pointer is computed with base addresses, domain offsets, and boundary-check segments so processors can detect cross-domain access attempts. For example, the encoder may reserve instruction offsets 0x0000-0x1FFF for transportation operations and 0x2000-0x3FFF for energy operations, insert domain-start and domain-end markers, and set pointer-link fields such that any runtime pointer arithmetic that attempts to jump outside a marker results in a boundary-check fault; these pointer configurations are also annotated with minimal execution privileges so that nodes that host only environmental logic will not be permitted to activate authorization adjustments for the public-safety domain. During packaging, domain-context metadata is embedded directly into the instruction stream—either as compact tagged segments preceding each domain block or as in-line metadata fields within each instruction pattern—so that a node, on receipt, can perform lightweight policy validation (verifying that it is authorized to execute instructions for the declared domain) prior to activation. In distributed deployments this embedding enables selective dispatch: the orchestration layer consults node capability and policy registries and transmits only those domain-mapped instruction blocks that match the node's domain responsibilities and runtime trust level. At execution time the domain context influences both safety checks and execution semantics: domain-specific guards may enable stronger integrity markers for public-safety instructions, relaxed timing constraints for energy rebalancing steps, or privacy-preserving encodings for citizen-identifiable operations; state transitions are applied only to the domain slice of ledger state, preventing unintended cross-domain side effects. The technical effect of this embodiment is deterministic, domain-aware ledger adaptation—ledger modifications become scoped, auditable, and enforceable according to smart-city domain boundaries rather than being applied globally in a one-size-fits-all manner.

In an embodiment, processing the smart-city telemetry in the AI-based analytical sequence further comprises identifying outlier telemetry points by computing an intra-interval deviation score for each fused multi-field record, comparing the deviation score to deviation boundaries stored in a telemetry integrity table, flagging all records with deviation scores outside the boundaries, generating reconstructed values for the flagged records by interpolating between adjacent non-flagged records within the same subsystem, reinserting the reconstructed values into the organized digital structure, and propagating the reconstructed structure through the transformation layers to ensure that internal representation values incorporate corrected telemetry input rather than raw outlier values.

The process begins by computing an intra-interval deviation score for every fused multi-field record. To do this, the processor evaluates each record against statistical profiles of its own recent history as well as domain-specific expected ranges. For example, transportation speed, energy load, and environmental PM2.5 values are each compared to short-window moving averages, trimmed standard deviations, and subsystem-specific variance envelopes. The deviation score may be computed as a normalized distance—such as (value– median)/MAD for robust fields or a Mahalanobis distance when evaluating multiple correlated fields together—to capture both univariate and multivariate irregularities. Once computed, the deviation score for each record is compared against deviation boundaries stored in a telemetry-integrity table. These boundaries are not static; they are periodically updated from historical distributions and operational policies so the system can distinguish true anomalies from legitimate extreme events. Any fused record with a deviation score outside its permissible interval is flagged as an outlier.

For each flagged record the system performs a subsystem-consistent reconstruction rather than simply dropping the data or clipping it to a threshold. The reconstruction relies on interpolation between the nearest non-flagged records of the same subsystem, ensuring that contextual and temporal continuity is preserved. For a scalar field such as instantaneous grid load, a weighted linear interpolation may suffice. For fields with non-linear dynamics—such as congestion levels or particulate matter spikes—the system may apply spline interpolation or a matched-pattern reconstruction that uses shape templates derived from the same subsystem's historically normal behavior. For example, if a transportation record suddenly reports zero vehicles on a major roadway surrounded by records showing typical vehicle flow, the system interpolates from the prior and subsequent fusion vectors to produce a plausible, non-zero reconstructed traffic density. If multiple adjacent records are flagged, the system expands the interpolation window symmetrically to maintain smooth curves and prevent abrupt discontinuities that could distort gradients in downstream layers.

Once reconstructed, the corrected fused record is reinserted into the unified digital structure in place of the original outlier. Importantly, the system tags each reconstructed record with provenance metadata—including timestamps of the source records used for interpolation, error bounds, and the applied reconstruction method—so the AI layers can modulate their confidence appropriately. The unified structure therefore becomes a temporally coherent, statistically consistent dataset ready for transformation.

The reconstructed structure is then propagated through all transformation layers of the AI-based analytical sequence. Because all deviations have been corrected at the data-preconditioning stage, the transformation layers no longer amplify noise or treat sensor corruption as meaningful patterns. Instead, each layer receives stable fused vectors whose spatial and temporal relationships reflect realistic subsystem behavior. This yields internal representation values that better reflect true operational conditions: for instance, anomaly detectors no longer generate spurious alerts from sensor glitches, privacy-sensitivity estimators do not misinterpret one-off spikes in identity-linked accesses, and workload-progression indicators are not corrupted by single-sample measurement noise in energy or transportation telemetry.

In an embodiment, computing privacy-relevant sensitivity indicators in the AI-based analytical sequence comprises assigning preliminary privacy-classification weights to telemetry fields based on stored classification rules, inserting the classification weights into selected positions of the transformation sequence, propagating the classification weights layer-by-layer while computing combination values between the classification weights and intermediate transformation outputs, generating updated privacy-sensitivity indicators by comparing the propagated combination values with stored privacy escalation limits, and storing the updated indicators as part of the internal representation values used for evaluating ledger-configuration sets.

In one practical implementation, privacy-sensitivity assessment begins by materializing a compact privacy-classification catalog in memory that enumerates telemetry field types, associated sensitivity tags (for example "direct-identifier," "quasi-identifier," "derived-identifier," or "non-identifying"), and rule-based weight priors derived from policy and empirical risk analysis; when a fused multi-field record enters the analytical pipeline the module consults that catalog and assigns to each telemetry element a preliminary privacy-classification weight (for instance, a direct-identifier such as a national ID field might receive a weight of 0.95, a location trace field 0.78, and an ambient temperature reading 0.02) and normalizes these weights to a common range so they are commensurate with numeric activations used by the neural transformations. These normalized classification weights are then inserted into the transformation sequence at deterministic insertion points—either as multiplicative gates applied to selected intermediate activations or as additive bias vectors injected into specific layers—so that the weights modulate the signal flow in the same computational graph that produces security and workload features;

for example, a mid-layer vector of length 128 might be element-wise multiplied by an expanded privacy-weight mask so that activations corresponding to identity-linked fields are attenuated or highlighted depending on policy. As the signals propagate layer-by-layer, the engine computes combination values that blend the privacy weights with the intermediate transformation outputs using parameterized combination functions (such as gated linear units, attention-weighted sums, or learned affine transforms) that the system can tune; these combination values capture both the intrinsic sensitivity of the data field and the contextual importance conferred by co-occurring features (for instance, a location-time pair that alone is low-risk may increase in sensitivity when paired with frequent access-pattern features). The propagated combination values are continuously compared against privacy escalation limits stored in a protected pri-vacy-policy store—these limits are multi-dimensional ranges that account for regulatory constraints, organizational risk appetite, and historical re-identification scores—and when the combination values exceed escalation thresholds the pipeline computes updated privacy-sensitivity indicators (numerical scores and categorical tags) by applying scaling and smoothing operators to avoid abrupt binary flips (for example using exponential moving averages and capped scaling factors so that a single transient spike does not immediately force maximal masking). The computed pri-vacy-sensitivity indicators are then encoded into the internal representation array as dedicated privacy channels (for example, a 16-element privacy vector containing per-do-main aggregated sensitivity scores plus an overall privacy intensity scalar) and are persisted to the representation store with timestamps and provenance metadata so downstream configuration evaluation can audit their origin.

In an embodiment, the method comprises generating a security event gradient for each telemetry interval by com-puting the incremental differences between anomaly-related features extracted from successive fused records, propagat-ing the event gradient across multiple layers of the analytical sequence by repeatedly updating weight parameters based on the gradient's magnitude and direction, combining the propagated gradients into a cumulative security pattern vector, and inserting the cumulative security pattern vector into the internal representation values employed during ledger-configuration evaluation.

In this embodiment the analytical pipeline explicitly con-verts short-term anomaly changes into directed, multi-layer signals by computing a security event gradient for each telemetry interval and folding that gradient through the transformation layers so the ledger-evaluation logic receives a temporally aware security pattern rather than isolated anomaly flags. Concretely, the processor first extracts a concise anomaly-feature vector from each fused record—for example components such as unauthorized-access-rate, sud-den-authentication-failures, sensor-tamper-score, packet-loss-rate, and cross-subsystem-correlation-spike—and arranges these vectors in temporal order. For two successive fused records taken at times $t$ and $t+\Delta t$ the system computes a per-component incremental difference divided by the inter-val (i.e., $gradient\_i=(feature\_i[t+\Delta t]-feature\_i[t])/\Delta t$) pro-ducing a raw gradient vector that captures both magnitude and sign (direction) of change; for instance, if unauthorized-access-rate increases from 0.02 to 0.11 over a 10-second window the gradient component becomes 0.009 s 1, signal-ling a rapidly growing intrusion signal. Each raw gradient is then normalized against historical volatility baselines (using rolling MAD/std windows) and clipped to policy-defined bounds so outlier single-sample spikes do not produce unbounded updates; the normalization step also yields a confidence score per component based on sample density and recent measurement quality.

The normalized gradient is propagated across the AI transformation layers through an iterative weight-adjust-ment routine designed to translate transient directional sig-nals into sustained representational change without destabi-lizing learned structure. Specifically, at each layer the pipeline converts the incoming gradient into a parameter-adjustment vector that modulates layer responses: small, high-confidence positive gradients increase layer respon-siveness to the affected feature (implemented as multiplica-tive gain adjustments on feature channels or as adaptive bias shifts), while negative or low-confidence gradients attenuate sensitivity.

Finally, the cumulative security pattern vector is inserted into the internal representation arrays consumed by the ledger-configuration evaluation stage; the evaluation logic maps specific pattern dimensions to candidate configuration responses (e.g., mapping a rising tamper dimension to higher validation quorum or temporary restriction of certain data-write operations) and uses the confidence and decay metadata to choose conservative, proportional actions rather than abrupt, binary switches. Safeguards are woven through-out: gradient components are sanitized for missing or low-quality inputs, propagation updates respect inter-field and inter-layer consistency constraints derived from the con-straint-enriched specification, and any proposed configura-tion action triggered by the cumulative vector must pass the same simulated-dry-run and inter-field-checks used else-where before being deployed. The technical effect of this embodiment is to provide anticipatory, temporally aware security signals that amplify genuine, coherent attack or compromise trends while filtering transient noise—enabling earlier, proportionate ledger adaptations (for example pre-emptive quorum tightening, temporary throttling of sensitive writes, or insertion of additional integrity checks) with mathematically controlled stability, full audit trails for each propagated update, and demonstrable reduction of false-positive-driven configuration churn.

In an embodiment, generating the candidate ledger-con-figuration sets further comprises executing a multi-stage mutation pipeline that includes creating a baseline configu-ration set, generating first-stage mutated sets by adjusting timing-control fields within allowed temporal boundaries, generating second-stage mutated sets by adjusting valida-tion-control and authorization-control fields according to stored dependency constraints, combining first-stage and second-stage mutated sets by merging compatible mutated entries, validating the merged sets against inter-field con-sistency tables, and storing all validated merged sets as candidate configuration rows within the configuration matrix.

In one embodiment, the generation of candidate ledger-configuration sets is implemented as a controlled mutation pipeline that systematically explores safe variations of the baseline configuration while ensuring conformance to tim-ing, validation, authorization, and inter-field dependency rules. The process begins by constructing a baseline con-figuration set, which contains the most recently approved or system-default ledger parameters. This baseline may include elements such as a 1.2-second block interval, a validation quorum of 5 nodes out of 8, an authorization threshold that requires dual-signature approval for sensitive transactions, and a data-handling-control field specifying medium privacy masking. The system encodes this baseline as a multidimensional vector so that each field can be mutated using mathematically defined rules rather than ad hoc modifications.

To explore performance-responsiveness without compromising correctness, the system performs first-stage mutations specifically targeting the timing-control field. Timing mutations are constrained by temporal boundaries stored in a timing rule store, such as minimum block intervals required to avoid bandwidth collapse or maximum intervals allowed before information staleness becomes unacceptable. For example, if the baseline block interval is 1.2 seconds and timing boundaries for the current domain vary between 0.8 seconds and 2.5 seconds, the system may generate first-stage mutated variants such as 1.0 seconds, 1.4 seconds, and 1.7 seconds by applying controlled increments and decrements. Each mutated timing field is marked with metadata indicating the degree of deviation applied and the rationale (e.g., "reduced interval to improve throughput under rising workload conditions").

In a second-stage mutation phase, the system mutates both validation-control and authorization-control fields. However, these fields cannot be freely adjusted because they are governed by formal dependency constraints that ensure alignment with security and governance logic. For instance, if validation quorum must always exceed half of the active node count, or if authorization thresholds for sensitive transactions must scale proportionally with anomaly intensity, then candidate values outside these constraints are immediately disallowed. A practical example is increasing validation quorum from 5 to 6 for a network of 8 nodes, but not to 3 or 8 if the dependency rules specify quorum must remain within 60%-85% of node count. Similarly, a mutation might reduce authorization strictness only if recent privacy-sensitivity indicators remain below a threshold; otherwise, the mutation engine restricts such downward adjustments. Through this process, the second-stage mutations produce vectors capturing permissible variations of both validation and authorization settings.

Once the first-stage (timing-focused) and second-stage (validation/authorization-focused) sets are generated, the system enters the combination stage, in which compatible mutated entries are merged to produce composite configuration sets. Compatibility checks use constraints stored in a dependency graph; for example, a short block interval may not be compatible with an extremely high validation quorum because such a pairing might overwhelm nodes and produce block-finalization bottlenecks. Meanwhile, a relaxed block interval may be compatible with a more stringent authorization requirement because the extended processing time permits additional signature checks. Only combinations that satisfy these logical compatibility patterns are merged into composite sets.

Before the system accepts a composite set, it must undergo rigorous inter-field consistency validation. The consistency tables include rules such as: "If validation quorum is increased by more than 20%, block interval must not decrease by more than 10%," or "If authorization strictness increases, privacy-controlled data-handling fields must be adjusted accordingly." The system executes consistency checks using these tables, and any configuration failing even one rule is discarded. For example, if a merged candidate proposes a reduced block interval of 0.9 seconds together with a steep quorum increase requiring multiple cryptographic operations, and this combination exceeds the node-capability thresholds recorded in prior telemetry, the consistency validation rejects the set.

All surviving, fully validated merged sets are then serialized and stored as candidate rows in the configuration matrix, each row representing a viable, internally consistent configuration the evaluation module can select from in the next operational cycle. Each row includes version identifiers, mutation lineage metadata, dependency-satisfaction flags, and performance predictions inferred from analytical models. These candidate rows form the "voting pool" from which the configuration-evaluation logic—driven by security, privacy, and workload representation values—selects the most appropriate configuration for the upcoming ledger cycle.

In an embodiment, evaluating the candidate ledger-configuration sets further comprises generating a cross-representation matching vector by selecting from the internal representation values those entries associated with security deviations, privacy sensitivity markers, and workload progressions, computing a match-difference vector between the cross-representation matching vector and each configuration set, determining match-strength scores by applying weighted combination operations to the match-difference vector, and selecting the configuration set whose match-strength score is nearest to a predefined evaluation threshold stored in a configuration evaluation range.

In this embodiment the evaluation engine translates abstract internal representations into concrete, score-driven comparisons with each candidate ledger configuration by creating a compact, numerically normalized "matching" fingerprint for both the live system state and for every candidate, then using robust difference metrics and policy-weighted scoring to pick the most appropriate configuration in a transparent, auditable way. Concretely, the processor first builds a cross-representation matching vector by extracting from the full internal representation array only those dimensions that are known (via the stored linkage table) to influence ledger behavior: for example a security subvector (anomaly intensity, tamper-index, event-gradient magnitude), a privacy subvector (sensitivity scores, access-entropy, recent mask-failure counts), and a workload subvector (load-intensity, escalation-magnitude, latency-trend). Each extracted dimension is normalized to a common numeric domain (for instance z-score or min-max scaled to [0,1]) using the same historical windows and normalization rules applied during representation construction so that comparisons are consistent and reproducible. The engine may optionally reduce dimensionality for noisy or high-cardinality feature sets—applying a lightweight PCA or learned projection precomputed during model training—while preserving interpretability by keeping a mapping that reconstructs which original features contributed most to each projected axis.

For each candidate configuration set the system constructs an analogous configuration-reference vector by mapping configuration field values into the same representation space: timing-control entries are converted into expected workload-response features (e.g., a shorter block interval maps to higher expected validation throughput), validation-control fields map to expected security-responsiveness axes (e.g., higher quorum maps to increased tamper-resilience), and data-handling-control fields map to privacy-impact axes (e.g., on-chain storage density increases the privacy exposure projection). This mapping is produced deterministically by a stored encoder function (a table or small model calibrated from historical deployments) so that every configuration has a predictable numeric fingerprint in the same space as the live matching vector.

The engine computes a match-difference vector for each candidate by subtracting the configuration-reference vector from the live cross-representation matching vector and optionally applying an element-wise absolute or signed transform depending on whether directionality matters (for example when a higher live security-score should be matched by a configuration with a higher validation setting, a signed difference is meaningful; for symmetric tolerances an absolute difference is used). To turn differences into a single scalar that supports ranking, the system applies a weighted combination operation: each element of the difference vector is multiplied by a policy or learned weight that encodes the relative importance of security, privacy, and workload in the current operational mode (these weights can be dynamic and mode-dependent—e.g., in emergency mode security weight increases) and the weighted elements are summed using an Lp norm or a learned aggregation function to compute a match-strength score. The aggregation can be tuned to penalize under-provisioning more heavily than over-provisioning (asymmetric loss), for example by applying larger penalties when a security shortfall is detected than when a configuration is overly conservative; this is implemented by element-specific cost multipliers within the weighting vector.

Selection of the winning configuration then proceeds by ranking candidate match-strength scores according to proximity to a predefined evaluation threshold or target region stored in a configuration evaluation range. The threshold can be absolute (choose the candidate with smallest distance) or banded (choose candidates whose score falls within an acceptable band and then prefer lower operational cost among them). If multiple candidates are near-equal by score, tie-breakers are applied deterministically: prefer candidates that require smaller delta from current live settings (minimize churn), prefer candidates whose provenance indicates higher historical success for similar representation patterns, or prefer configurations that satisfy explicit policy constraints (e.g., do not reduce authorization below a legal minimum). Before committing, the engine runs a safety verification pass where the chosen configuration's predicted effects are simulated against a fast node model using the current telemetry snapshot; if the simulation detects violations of inter-field constraints, the engine either selects the next-best candidate or modifies the candidate via a constrained repair step (for example marginally adjusting a timing field to respect quorum feasibility) and re-evaluates the score.

As a concrete numeric illustration, if the live matching vector normalizes to security=0.8, privacy=0.6, workload=0.7 and three candidates map to fingerprints C1=(0.7, 0.5,0.75), C2=(0.9,0.4,0.65), C3=(0.6,0.7,0.9) and policy weights are [w_sec=3, w_priv=2, w_work=1], the difference vectors become D1=(0.1,0.1, −0.05), D2=(−0.1,0.2,0.05), D3=(0.2,−0.1,−0.2); applying absolute value and weights yields scores $S1=3\cdot0.1+2\cdot0.1+1\cdot0.05=0.55$, $S2=3\cdot0.1+2\cdot0.2+1\cdot0.05=0.85$, $S3=3\cdot0.2+2\cdot0.1+1\cdot0.2=1.0$ so C1 would be selected as nearest to the threshold (lowest weighted mismatch) subject to simulation confirmation. Operationally the system then packages C1 into an instruction manifest, notes the match evidence, and proceeds with the established two-stage commit. The technical effect of this embodiment is to convert heterogeneous, multi-aspect internal representations into a principled, tunable selection mechanism that balances security, privacy, and scalability tradeoffs, prevents erratic configuration changes by weighting and simulation, produces fully auditable selection records for legal and operational oversight, and enables predictable, policy-compliant adaptation of ledger behavior in response to real-world telemetry.

In an embodiment, interpreting the software-engineering specifications comprises performing extended constraint propagation by scanning all hierarchical identifiers for both direct and indirect dependency indicators, generating a dependency expansion table that enumerates each identifier's downstream impact on other identifiers, inserting expanded dependency indicators into the constraint-enriched representations, and resolving conflicting constraint paths by applying a consistency-checking procedure that retains only those constraints that maintain structural coherence across the expanded table.

In one practical implementation, interpreting the software-engineering specifications to achieve extended constraint propagation is realized by traversing the parsed hierarchical identifiers produced during specification parsing and systematically expanding both direct and indirect dependency relationships into an explicit, machine-tractable dependency model. The implementation begins by building a directed acyclic graph (or, when cycles are present, a directed graph with marked back-edges) where nodes represent hierarchical identifiers (for example, Transport.Sensor.Fusion.Window, Energy.Grid.Rebalance.Timeout, or Auth.Role.Manager) and labeled edges represent explicitly declared dependencies (such as "reads", "writes", "triggers", or "requires") discovered during scanning. A depth-first expansion routine then explores each node's downstream reachability: for a given identifier A the routine performs a bounded recursive descent to collect both immediate children (direct dependencies) and grandchildren and beyond (indirect dependencies), while annotating each discovered path with provenance metadata including path length, conditional guards encountered, and estimated impact weight computed from static heuristics or historical execution statistics. These collected paths are materialized into a dependency expansion table—a tabular structure indexed by source identifier that lists every downstream identifier reachable from that source, the specific path(s) connecting them, conditional predicates attached to the path, and a cumulative impact score that quantifies how strongly changes to the source are expected to affect the sink (for example, an impact score might be 0.87 for Transport.Sensor→Ledger. Validation where empirical data shows frequent causal influence, but 0.12 for Ambient.Temp→Auth.Role.Manager). The expansion algorithm purposely applies pruning rules to bound complexity: transitive relationships that traverse through low-impact nodes or that exceed a configurable maximum path length are collapsed into summarized entries to avoid combinatorial explosion. Once the dependency expansion table is constructed, its entries are merged back into the existing constraint-enriched representations by inserting expanded dependency indicators-structured annotations attached to each identifier that enumerate downstream effects, conditional activation contexts, and impact weights—so that later mapping and instruction construction stages can consult a single, unified representation for both local and propagated constraints. To ensure logical coherence the system executes a consistency-checking procedure that examines the expansion table for conflicting constraint paths (for example, one path that implies Identifier X must be read-only when Identifier Y is active versus another path that requires Identifier X to accept writes under the same condition), and resolves conflicts using a deterministic policy: conflicts are first ranked by provenance confidence (favoring constraints derived from authoritative domain rules over speculative derived constraints), then by impact score, and finally by explicit conflict-resolution rules embedded in a policy store (for example, "security constraints override performance optimizations" or "local domain invariants override cross-domain suggestions"). When two paths remain intransigent after policy application the system either synthesizes a guarded composite constraint (introducing an additional predicate that enforces mutual exclusion at runtime) or flags the pair for automatic mitigation by inserting compensating transitions into the state-adjustment list (such as inserting an intermediate synchronization step). Throughout this process the interpreter records audit metadata and produces a coherence certificate indicating the expansion pass version, any prunings performed, and the set of retained constraints; this certificate is used downstream to guarantee that mapping and encoding operate on a constraint set that preserves structural coherence.

In an embodiment, extracting conditional execution descriptions comprises executing a multi-phase trigger consolidation operation that includes detecting all trigger expressions across the segmented specifications, grouping the trigger expressions based on shared domain context or identical conditional fields, computing a consolidated expression for each group by merging overlapping conditional fields, generating consolidated trigger identifiers for each merged group, and replacing the original trigger references with the consolidated trigger identifiers prior to mapping to state-adjustment structures.

In this embodiment the processor implements a deterministic, multi-phase trigger-consolidation pipeline that converts distributed, potentially overlapping conditional expressions in the specification into a compact, canonical set of consolidated triggers that are safe to map into state-adjustment logic. The pipeline begins by locating every conditional clause across the segmented specification using the same tokenization and expression-grammar infrastructure described earlier, normalizing each discovered trigger into a canonical form (for example converting relational operators to a normalized set, expanding time-window shorthand into explicit interval predicates, standardizing units, and replacing synonyms such as "if repeated"→"count≥N within window W"), and then inserting the canonical triggers into a trigger-index table keyed by normalized predicate signatures. Next, the consolidation phase groups triggers by shared domain context (transportation, energy, public-safety, environmental) and by equivalence of conditional fields (e.g., all predicates referring to congestion, validation-quorum, or user-id), producing candidate groups that are likely to express the same operational intent. For each candidate group the processor computes a consolidated expression by applying logical-merging operations: overlapping numeric thresholds are merged into minimal covering intervals (so congestion>80% and congestion>85% become a single consolidated predicate with metadata recording both original bounds and a preferred operational threshold), conjunctive and disjunctive clauses are simplified using Boolean algebra and short-circuit rules (for instance (A and B) or (A and C) becomes A and (B or C)), and temporal predicates are folded into explicit sliding-window representations to preserve detection semantics. Where predicates refer to semantically similar but syntactically different fields (for example vehicle_density and veh_count_normalized) the pipeline applies a field-alias resolution step using the specification's mapping dataset so consolidation operates on semantics rather than raw names. During merging the system enforces consistency rules from the constraint-enriched specification: incompatible conditions (e.g., two triggers that would require mutually exclusive ledger states under the same temporal overlap) are flagged and resolved deterministically by precedence (explicit priority annotations, hierarchical depth, or policy weight), or else they are split into separate consolidated triggers with explicit mutual-exclusion metadata so downstream mapping can treat them atomically. Each consolidated expression is assigned a compact consolidated trigger identifier (a stable fingerprint combining domain tag, normalized predicate signature, and a versioned hash) and an explanatory provenance record that lists constituent original triggers, the precise merge operation applied, and any resolution rationale—this ensures human-auditable traceability from final trigger back to authoring lines. As a concrete example, two specification fragments "if congestion>80% then mask user-id" and "if congestion>=85% for 30 s then increase quorum" would be normalized, grouped on congestion, and yield two consolidated triggers: one representing a short-window mask condition (threshold 80% with hysteresis and masking action metadata) and another representing sustained high-congestion escalation (threshold 85% with 30 s duration), each carrying provenance and an explicit relation that the first is a superset alert of the second; downstream mapping can therefore generate non-conflicting state-adjustments (masking immediately, quorum increase only after sustained condition) without re-evaluating overlapping raw triggers.

In an embodiment, encoding the state-adjustment structures further comprises generating an integrity-aware instruction stream by inserting a multi-byte integrity marker before and after instruction segments derived from high-sensitivity or high-impact state adjustments, computing an integrity-sequence index for each such segment, associating the index with pointer offsets for runtime verification, and combining the integrity-marked segments with non-marked segments into a finalized continuous instruction stream that includes integrity markers embedded at each designated boundary.

In one practical implementation, the encoding stage produces an instruction stream that is deliberately made integrity-aware by wrapping any instruction segments that correspond to high-sensitivity or high-impact state adjustments with explicit multi-byte integrity markers and by calculating compact integrity indices that the runtime can verify cheaply; concretely, after state-adjustment entries are serialized into binary instruction patterns (opcode, operand, boundary-check), the encoder classifies each segment according to an impact score and, for those above a sensitivity threshold, prefixes and suffixes the segment with a fixed-format integrity header and trailer (for example a 4-byte start marker 0xDEADBEEF, a 2-byte segment-type tag, a 4-8 byte integrity-sequence index, then the instruction bytes, followed by a 4-byte trailer and a 16-byte MAC or truncated HMAC value). The integrity-sequence index is computed deterministically from the segment's provenance (domain tag, trigger id, mutation lineage) and a monotonically increasing sequence counter, then compacted (e.g., via a keyed hash) into a short index field that is stored both inline and in a sidecar index table; pointer offsets for each instruction pattern are calculated relative to domain base addresses and the encoder records the offset of the integrity-indexed marker in a pointer map so that at runtime a node can jump to the marker location and perform pointer-aligned verification. To minimize runtime overhead the encoder supports two verification modes: (1) lightweight pointer-checking where the runtime validates that the integrity-index stored at the pointer position matches the expected index in the sidecar table (detecting accidental corruption or pointer tampering), and (2) cryptographic verification where the node computes an HMAC over the enclosed segment and compares it to the trailer MAC before executing any state-changing operation; the system may choose mode (1) for low-latency segments and mode (2) for high-impact segments, with rules encoded in the marker metadata. The encoder also aligns markers to word boundaries and inserts small synchronization NOPs if necessary so that pointer arithmetic and memory-mapped execution do not cross marker boundaries, and it annotates each marker with execution-policy flags (e.g., require-local-authorization, require-distributed-consensus, rollback-on-failure) that the node's execution monitor interprets during runtime verification. If a runtime verification fails—whether due to index mismatch, MAC failure, or an attempted cross-domain pointer jump—the node emits a structured fault telemetry record (including node id, pointer offset, failed-check type, and recent execution context) and aborts or quarantines the affected segment according to the encoded policy; these telemetry records feed back into the analytical engine so that problematic encoding patterns or compromised nodes are rapidly detected and the representation values updated.

In an embodiment, modifying the instruction-sequence ordering comprises computing adaptive realignment values from execution telemetry by extracting latency fluctuations, load distribution irregularities, and cross-node timing variations, comparing the extracted values with realignment boundaries stored in a state-alignment reference table, generating updated execution-order indices for instruction segments affected by the fluctuations, and reconstructing the instruction sequence by inserting segments at index positions corresponding to the updated execution-order indices.

In this embodiment the processor implements a closed-loop, telemetry-driven realignment pipeline that converts live execution signals into concrete reordering decisions by first extracting fine-grained timing and load metrics, translating those metrics into adaptive realignment values, and then deterministically rebuilding the instruction stream to reduce contention and latency while preserving correctness and auditability. The routine begins with collection and normalization of execution telemetry across the node fleet: latency fluctuations are measured as inter-message and inter-commit time deltas (e.g., mean and variance of block-propagation times over sliding windows), load-distribution irregularities are quantified as per-segment CPU and I/O utilization and queue-depth histograms, and cross-node timing variations are captured as clock-offset series and propagation-delay matrices; each raw metric is converted into canonical units and smoothed by a configurable exponential moving average to reduce sensitivity to single-sample jitter. For example, if telemetry shows transportation-related instruction $S\_T$ has a realignment value −0.7 due to a sustained latency spike in its downstream validation window while energy instruction $S\_E$ has +0.3, the scheduler will compute a new index that moves $S\_T$ earlier within the allowable pre-synchronization region, shift $S\_E$ later if safe, update only the pointer of $S\_T$'s previous predecessor and $S\_E$'s previous predecessor atomically, and publish the new manifest; after deployment the system monitors targeted metrics (latency, propagation, boundary-check failures) and computes an improvement score—if the expected latency reduction does not materialize beyond a configured confirmation interval the system reverts to the prior manifest using the preserved pointer snapshot and records the decision provenance. To avoid oscillation, realignment changes include hysteresis (a segment must sustain a threshold-crossing realignment value for N consecutive windows before relocation) and rate-limiting (maximum allowed pointer churn per minute), and the pipeline supports graded realignment where small-magnitude values trigger low-cost local regroupings rather than wholesale reorderings.

In an embodiment, computing configuration evolution values by retrieving representation patterns from multiple prior execution intervals, measuring cross-interval deviations between stored patterns and updated patterns, generating evolution weights by applying progressive scaling factors to the deviations, computing evolution-adjusted field values by combining the evolution weights with current ledger-configuration values, and updating the ledger-configuration fields with the evolution-adjusted values for use in subsequent operation cycles.

In this embodiment the system implements a temporally aware configuration-evolution pipeline that turns historical representation trajectories into principled, stability-preserving updates of ledger-configuration fields by computing evolution values from multi-interval pattern comparisons, deriving adaptive evolution weights, and blending those weights with current field settings under constraint-checked rules. The routine begins by retrieving a sliding window of prior internal representation patterns from a time-indexed repository—these patterns may span recent execution cycles (for example the last 5-20 intervals) and include the same dimensions used for configuration mapping such as security-anomaly scores, workload-progression indices, and privacy-sensitivity markers. Each historical pattern is aligned to the current interval using the system's temporal indexing so that cross-interval comparisons are coherent; alignment corrects for small clock drift or missing-slice reconstructions by using the previously described alignment table and interpolation metadata. The processor then measures cross-interval deviations by computing per-dimension difference series (for instance simple increments, percent-change, or normalized z-differences) between the most recent pattern and each stored historical pattern, and summarizes each dimension's volatility using robust statistics such as median absolute deviation and exponentially weighted moment estimates. These deviation summaries quantify both the magnitude and consistency of change: a large, sustained deviation across several intervals signals a persistent trend, whereas sporadic deviations indicate transient noise.

Next the system generates evolution weights by applying progressive scaling rules to the deviation summaries. The scaling rules map deviation magnitude and persistence into a weight in $[0, 1]$ where larger, sustained deviations yield higher weights indicating greater justification for configuration change. The mapping can be a smooth function such as a sigmoid of the product of normalized deviation and a persistence factor (e.g., weight=sigmoid $(\kappa\cdot\mathrm{dev\_norm}\cdot\mathrm{persist\_count}))$, or a piecewise linear schedule tuned by policy; the implementation also modulates weights by confidence terms derived from pattern completeness and provenance (lower weight if many interpolations contributed to the recent patterns), and applies policy biases that increase or decrease sensitivity during special operational modes (for example disaster-mode amplifies weight for public-safety-driven deviations). To avoid overreaction, the embodiment enforces a progressive scaling cap so evolution weights cannot leap from near zero to one in a single cycle without passing a multi-interval confirmation threshold.

With evolution weights computed, the processor calculates evolution-adjusted field values by blending the current ledger-configuration value with a target value implied by the deviation trend. The target can be derived via several mechanisms—direct mapping from a calibrated lookup table, a constrained projection computed by solving a small bounded optimization (minimizing expected representation mismatch subject to inter-field constraints), or as a scaled step toward the historical-average-adjusted objective. The blending rule often takes the form new_value=clip(current_value+weight·(target_value−current_value), min_allowed, max_allowed) where weight is the evolution weight and clipping enforces hard system constraints drawn from the constraint-enriched specification. If the target implies inter-field adjustments (for example a shorter block interval implies recalibrated quorum thresholds), the processor computes a coordinated vector update by solving the constrained system simultaneously—either via closed-form proportional rules or a small constrained solver—to preserve inter-field consistency and prevent violating operational invariants.

Before committing the evolution-adjusted values, the pipeline executes a battery of safety checks: simulated dry-run using a fast node model to predict immediate impacts, reapplication of inter-field consistency constraints, a review against stored deviation-threshold policies (to ensure legal or operational minima/maxima are respected), and generation of a change-manifest that captures evidence (the deviation series, weight computation, target derivation, and provenance). The manifest is queued for either automatic two-stage commit or human-in-the-loop approval depending on configured governance. To ensure convergence and avoid oscillation, the embodiment applies temporal smoothing (exponential moving average on applied configuration values), hysteresis windows (a change must persist across N cycles or exceed a magnitude M to be allowed), back-off rules when prior similar adjustments failed, and adaptive learning of the k scaling parameter based on post-change effectiveness metrics stored in a performance cache.

For example, suppose the stored representation patterns over the last 10 intervals show the workload-progression dimension rising from 0.3 to 0.75 steadily while security indicators remain stable; deviation summaries yield a normalized dev_norm of 0.45 and persist_count=6. With κ set to 4 the sigmoid mapping yields weight≈0.88, the current timing-control field of 6 s and a target timing of 4 s produce a blended new_value=6+0.88*(4−6)=4.24 s which is clipped to a minimum allowed 4.0 s if required; the processor then concurrently adjusts validation-control proportionally to preserve quorum feasibility, simulates the pair of changes, and—upon passing safety checks—publishes the manifest and atomically applies the update while logging the full decision trail. The technical effect of this embodiment is to provide configuration updates that are historically grounded, proportional to sustained operational trends, and constrained by safety and policy checks; this produces adaptive ledger configurations that follow meaningful system evolution rather than reacting to noise, improves stability and convergence of automated tuning, and supplies auditable rationale and roll-back capability for every evolution-driven change.

In an embodiment, processing the smart-city telemetry further comprises executing a telemetry preconditioning sequence that includes identifying discontinuities in the time-indexed entries by computing the temporal difference between successive fused telemetry records, classifying each discontinuity according to a discontinuity-type table stored in memory, generating a repair directive for each classified discontinuity by selecting a corrective interpolation rule that corresponds to the assigned discontinuity type, computing replacement values using the selected interpolation rule by referencing at least two earlier and two later fused telemetry records, inserting each computed replacement value into the organized digital structure in place of the original discontinuous value, and forwarding the preconditioned digital structure to the AI-based analytical sequence to ensure the transformation layers operate on temporally consistent and corrected telemetry inputs.

In one practical implementation the telemetry preconditioning sequence is realized as an automated, rules-driven repair pipeline that converts raw, irregular time-series inputs into temporally consistent records so the downstream analytical layers operate on reliable, physically plausible data; the pipeline begins by sliding a fixed-length temporal window across the fused multi-field record stream and computing inter-record time deltas for each field so that any gap, overlap, or unexpectedly short interval is flagged as a discontinuity when it exceeds field-specific thresholds (for example, a GPS-derived velocity sample missing for two expected ticks at 100 ms spacing or a power-meter reading delayed more than 1.5× the nominal interval). Each flagged discontinuity is then classified against a discontinuity taxonomy stored in memory—such as dropout (complete absence), jitter (variable sampling jitter), drift (slow baseline shift), spike (single-sample outlier), and repeated burst loss—using pattern classifiers that inspect adjacent samples, timestamp variance, and sensor health metadata; for instance, a single missing sample surrounded by consistent values is labeled as dropout while a monotonic change over many samples accompanied by sensor-derivative bias is labeled drift. For each discontinuity class the system maintains a library of corrective interpolation rules and repair directives: simple linear or spline interpolation for isolated dropouts, Kalman-filter-based smoothing for jitter and drift that explicitly models sensor noise and process dynamics, robust median-based replacement for isolated spikes, and model-informed reconstruction (for example using domain-specific physical models or learned imputation networks) when cross-field coupling exists (such as using correlated traffic-density and speed fields to reconstruct missing speed samples). The selected repair directive uses at least two earlier and two later fused records to form a local context—enabling higher-order interpolation and short-term trend estimation—so that replacing a missing grid-load value at time t uses values at t−2, t−1, t+1 and t+2 to compute a temporally consistent replacement (for example a cubic Hermite interpolant or a constrained Kalman smoother that respects known physical bounds). Repaired values are not blindly written over originals; the pipeline computes a confidence score for each replacement based on the repair rule, the local signal-to-noise ratio, and cross-field agreement (e.g., if reconstructed vehicle speeds conflict with lane-occupancy indicators the confidence is reduced), and the system annotates the organized digital structure with provenance metadata that records the repair method, confidence, and the identifiers of the source records used. The technical effect of this embodiment is that the AI layers receive temporally coherent, provenance-tagged inputs which substantially reduce false-positive anomaly detections and prevent transient sampling faults from causing inappropriate ledger reconfigurations, and the technical advancement is a domain-aware, multi-rule preconditioning architecture that combines statistical, model-based, and learned interpolation with confidence propagation and auditability—enabling robust, low-latency correction of multi-domain smart-city telemetry at scale and ensuring that adaptive blockchain behavior is driven by corrected, verifiable signals rather than noisy, misaligned raw logs.

In an embodiment, generating the internal representation values further comprises executing a sequential multi-stage transformation process in which the processor, at a first stage, forms an initial feature vector by selecting predetermined fields from the organized digital structure and combining them using stored field-weight coefficients, at a second stage computes derived feature sets by applying layer-specific non-linear combination rules to the initial feature vector, at a third stage iteratively refines the derived feature sets by updating each feature set according to a refinement rule that compares the current feature value with a historical reference held in an analytical memory buffer, and at a fourth stage aggregates the refined feature sets into representation arrays by concatenating them in a predetermined order and storing the resulting arrays as the internal representation values used for evaluating the ledger-configuration sets.

In this embodiment the processor constructs internal representation values through a deterministic, multi-stage transformation pipeline that explicitly specifies how raw fused telemetry is converted into stable, actionable representation arrays: at the first stage the system selects a predetermined set of fields from the organized digital structure—for example transportation: average_speed, vehicle_count, congestion_index; energy: instantaneous_load, frequency_deviation; public-safety: incident_score, audio_alert_rate; environment: PM2.5, AQI—and forms an initial feature vector by applying stored field-weight coefficients that normalize and prioritize inputs (the coefficients are held in a versioned weight-table and computed from historical importance analysis or policy bias; concretely the vector element for average_speed may be w_speed·norm(speed) where w_speed=0.8 and norm(•) scales to [0,1] using sliding-window min-max parameters), so that the initial vector is numerically consistent across domains and reproducible across replays. At the second stage layer-specific non-linear combination rules transform that initial vector into derived feature sets: each layer applies a defined non-linearity (for example ReLU-like thresholding for sparse anomaly channels, gated-tanh units for coupling-sensitive channels, or multiplicative attention-like scaling for cross-domain interaction terms) and may compute interaction features such as interaction_speed_load=tanh($\alpha$·norm(speed))·sigmoid ($\beta$·norm(load)) to capture non-linear co-dependence; each derived set is also augmented with engineered features like short-window derivatives (delta=current−previous) and localized statistical summaries (median, MAD) so higher layers receive both instantaneous and contextual signals. At the third stage the pipeline iteratively refines these derived feature sets by comparing current values with historical references stored in an analytical memory buffer: the buffer holds recent representative vectors, moving averages, and exemplar patterns; refinement applies a rule such as f_new=f_curr+$\eta$·clip((ref_target−f_curr), −$\Delta$, $\Delta$) where ref_target is a reference value derived from the memory (it can be an EMA, a percentile benchmark, or the closest historical exemplar), $\eta$ is an adaptive refinement coefficient computed from representation confidence (higher when measurement variance is low), and $\Delta$ limits per-iteration change to preserve numerical stability. Iteration continues for a bounded number of passes (for example 2-8 micro-iterations per telemetry interval) or until convergence criteria are met—such as the L2 norm of the change vector dropping below a threshold $\epsilon$—thus enabling small, controlled adjustments that incorporate both freshly observed signals and temporal context without permitting oscillatory updates. To illustrate, if a derived workload feature currently reads 0.65 while the memory EMA is 0.45 and $\eta$=0.4 with $\Delta$=0.1, the one-step refinement yields f_new=0.65+0.4·clip((0.45−0.65),−0.1, 0.1)=0.65+0.4·(−0.1)=0.61, a conservative move toward historical behavior that reduces sensitivity to transient spikes.

At the fourth stage the processor aggregates the refined feature sets into ordered representation arrays: refined security, privacy, workload, and domain-balance subvectors are concatenated in a deterministic schema (for example [sec_dims|priv_dims|work_dims|domain_balance_dims]) and supplemented with meta-entries such as per-dimension confidence, provenance flags (interpolated, reconstructed, masked), and a version token for the transformation pipeline; the resulting fixed-length arrays are then stored in an indexed representation store usable by the configuration-evaluation units. Implementation details ensure numerical repeatability—fixed-point encodings where necessary, explicit endianness, and timestamped versioning of weight-tables and non-linear parameter sets—while the pipeline exposes tuning knobs like $\eta$, $\Delta$, and convergence $\epsilon$ that are adaptively adjusted by the system's self-monitoring logic based on recent update success. The technical effect of this embodiment is to produce internal representations that are temporally smoothed yet responsive, that capture non-linear cross-domain interactions and historical context, and that are robust to noise and missing data; by defining explicit selection, transformation, iterative refinement, and aggregation procedures (with concrete update equations, bounded iteration, and reproducible encoding), the system provides an auditable, convergent mechanism by which fused telemetry is transformed into stable, decision-ready representation arrays used to evaluate and select safe, effective ledger-configuration sets.

In an embodiment, modifying at least one ledger-configuration field or instruction-sequence ordering based on the execution telemetry comprises executing a telemetry-to-behavior mapping routine that includes segmenting the execution telemetry into processing-time segments, validation-outcome segments, and propagation-delay segments, generating a telemetry deviation profile by computing the difference between values of each segment and corresponding stored baseline values, determining which ledger-configuration field or instruction-sequence pointer is linked to the segment showing the highest deviation by consulting a stored linkage table that maps telemetry segment types to configuration fields or pointer groups, computing an updated field value or pointer offset by applying a deviation-proportional scaling rule to the identified field or pointer, and writing the updated value back into the ledger-configuration set or instruction sequence before initiating the next execution cycle.

In this embodiment the processor implements a repeatable telemetry-to-behavior mapping routine that deterministically translates raw execution telemetry into precise updates to ledger-configuration fields or instruction-sequence pointers through segmented analysis, linkage-driven targeting, proportional scaling, and safety-checked commits. The routine starts by segmenting incoming execution telemetry into semantically meaningful groups—processing-time segments (per-instruction or per-segment CPU and wall-clock durations, queue wait times), validation-outcome segments (counts and rates of successful, failed, or timeout validations, consensus agreement latencies), and propagation-delay segments (inter-node message transit times, block-propagation jitter, and observed clock offsets)—using the same temporal indexing and slice identifiers already present in the organized digital structure so that every telemetry datum is addressable to a specific instruction segment or configuration field. For each segment the processor computes a telemetry deviation profile by differencing the current metric against stored baseline values (e.g., dev=(current−baseline)/baseline or an absolute difference for latency metrics) where baselines are maintained as exponentially weighted moving averages with confidence bands; the profile contains per-metric deviation magnitudes, directionality, and a confidence score derived from sample density and recent variance. The mapping routine next consults a precomputed linkage table that deterministically maps telemetry segment types and segment identifiers to the ledger fields or pointer groups they affect—for example mapping validation-outcome segments of a consensus module to the validation-control quorum field, propagation-delay segments to timing-control block-intervals, and processing-time segments for cryptographic-heavy instructions to authorization-control or instruction reordering pointer groups—and selects the linked target that exhibits the largest scaled deviation above its configured threshold, ensuring the mapping is traceable and auditable. Once a target field or pointer group is identified the processor computes an updated field value or pointer offset using a deviation-proportional scaling rule of the form update=current+s·f (dev,confidence), where s is a tunable sensitivity factor and f(•) is a bounded function combining deviation magnitude and confidence (for example f=clip($\alpha$·dev,−$\Delta$, $\Delta$)·sigmoid (confidence)), and then applies inter-field consistency constraints (the same constraint engine used during mutation and evaluation) to ensure the candidate update will not violate quorum vs timing feasibility or storage vs authorization capacity. Before committing the update the routine simulates a dry-run against a lightweight node model using the current snapshot to predict immediate invariant violations (e.g., a quorum raised beyond feasible consensus time given the candidate block interval) and applies temporal smoothing such as new=EMA(new, previous, $\beta$) or enforces hysteresis so only sustained deviations lead to changes. The write-back is performed atomically: configuration-value updates are packaged into a change manifest including prior value, proposed value, deviation evidence, confidence, and provenance and then applied via a two-phase commit (write-ahead log and atomic pointer swap or base-pointer flip for instruction streams) so partial writes cannot leave nodes in inconsistent states; if the dry-run or a runtime boundary check encoded in an instruction's boundary segment fails, the manifest is aborted and the system logs the failure and optionally enqueues a lower-risk compensating update. To prevent oscillation and excessive churn the embodiment rate-limits update frequency, adjusts sensitivity s downward after failed updates, and requires N consecutive windows of threshold-exceeding deviation for high-impact fields before acceptance. For example, if propagation-delay segments show an increase from a baseline 200 ms to 320 ms (dev=0.6) with high confidence, the linkage table points to the timing-control block interval; with s=0.5, f(dev,conf) =clip($\alpha$·0.6,−0.2,0.2)·0.95≈0.114, and current block interval of 6 s the computed update becomes 6+0.5·0.114≈6.057 s which is then smoothed, checked against min/max bounds and quorum feasibility, simulated, and either committed atomically or rejected with provenance recorded. Every step records detailed logs (pre/post values, contributing telemetry, linkage rationale, simulation results) enabling offline audit and causal analysis. The technical effect of this embodiment is a safe, closed-loop mechanism that maps observed execution deviations into proportionate, auditable, and constraint-compliant changes to ledger behavior or instruction ordering, improving responsiveness to operational conditions while preserving correctness, preventing destabilizing updates, and enabling robust rollback when predicted benefits do not materialize.

Referring to FIG. 2, a block diagram of a computer-implemented system for processing smart-city telemetry to generate and adapt blockchain ledger behavior through AI-based analytical operations is illustrated. The system 200 comprising one or more processors and a memory storing executable instructions which, when executed by the one or more processors, cause the system to perform operations. The system 200 comprises: a telemetry acquisition unit (202) configured to receive smart-city telemetry from transportation, energy, public-safety, and environmental subsystems of a smart-city infrastructure, the telemetry comprising subsystem-specific timestamps and numerical measurements; a segmentation unit (204) configured to divide the received telemetry into temporally bounded slices by identifying timestamp intervals for each subsystem and assigning a slice index generated by a monotonically increasing counter; a temporal-alignment unit (206) configured to construct an alignment table by comparing timestamps of the slices across the transportation, energy, public-safety, and environmental subsystems, identify timestamp offsets and drift values, and determine missing or misaligned entries within the slices; an interpolation unit (208) configured to reconstruct missing telemetry values by referencing nearest-neighbor slices identified through alignment-table lookups, generate reconstructed values according to stored interpolation rules, and replace incomplete slice entries with the reconstructed values; a fusion unit (210) configured to combine the subsystem-specific values of each slice into fused multi-field records by applying positional mapping rules stored in a mapping dataset, and to append boundary-limit flags and correlation markers derived from cross-subsystem relationships; an AI-analytical unit (212) configured to process the fused multi-field records by executing a sequence of weighted computational transformations to generate internal representation values that characterize security-related deviations, privacy-related sensitivities, and scalability-related workload progressions; a configuration-evaluation unit (214) configured to generate a plurality of candidate ledger-configuration sets, compare the internal representation values against fields of the candidate configuration sets, compute evaluation profiles, and select a configuration set to be applied to blockchain ledger behavior; and an instruction-construction unit (216) configured to interpret software-engineering specifications stored in memory, generate conditional execution descriptions, map the descriptions to state-adjustment structures, encode the state-adjustment structures into machine-interpretable instruction sequences, and dispatch the instruction sequences to distributed processing nodes of a blockchain network for execution and subsequent feedback-driven adaptation.

The system 200 and method 100 are implemented using computer hardware comprising one or more processors, electronic circuitry, and machine-readable memory, with each unit embodied as a physical computing component configured to execute stored instructions and perform deterministic data-processing operations. The telemetry acquisition unit is a hardware-executed interface module that receives subsystem data through physical communication channels and buffers the incoming signals in memory. The segmentation unit, temporal-alignment unit, and interpolation unit are implemented as processor-controlled hardware modules that operate on stored telemetry within addressable memory locations, performing slice indexing, timestamp comparison, offset calculation, and nearest-neighbor reconstruction through executable routines executed by dedicated processing circuitry. The fusion unit is a hardware-executed processing block that combines subsystem values into fused multi-field records by applying mapping rules stored in memory and generates boundary-limit flags and correlation markers through arithmetic operations carried out by the processor. The AI-analytical unit is realized as a hardware-based computational engine configured to execute weighted mathematical transformations using arithmetic logic circuitry and memory-resident parameter matrices to produce internal representation values. The configuration-evaluation unit comprises processing hardware configured to generate candidate ledger-configuration sets, perform vector comparisons, compute evaluation profiles, and select an operational configuration through processor-executed algorithms. The instruction-construction unit is a hardware-implemented encoding engine that reads software-engineering specifications from memory, generates conditional execution descriptions, translates them into state-adjustment structures, and encodes them into machine-interpretable instruction sequences using processor-executed routines before dispatching the encoded sequences through hardware communication interfaces to distributed processing nodes of a blockchain network. Collectively, each unit operates as a concrete, computer-implemented hardware component performing technical data-processing functions using processors, memory, and electronic control circuitry.

Figure 3:
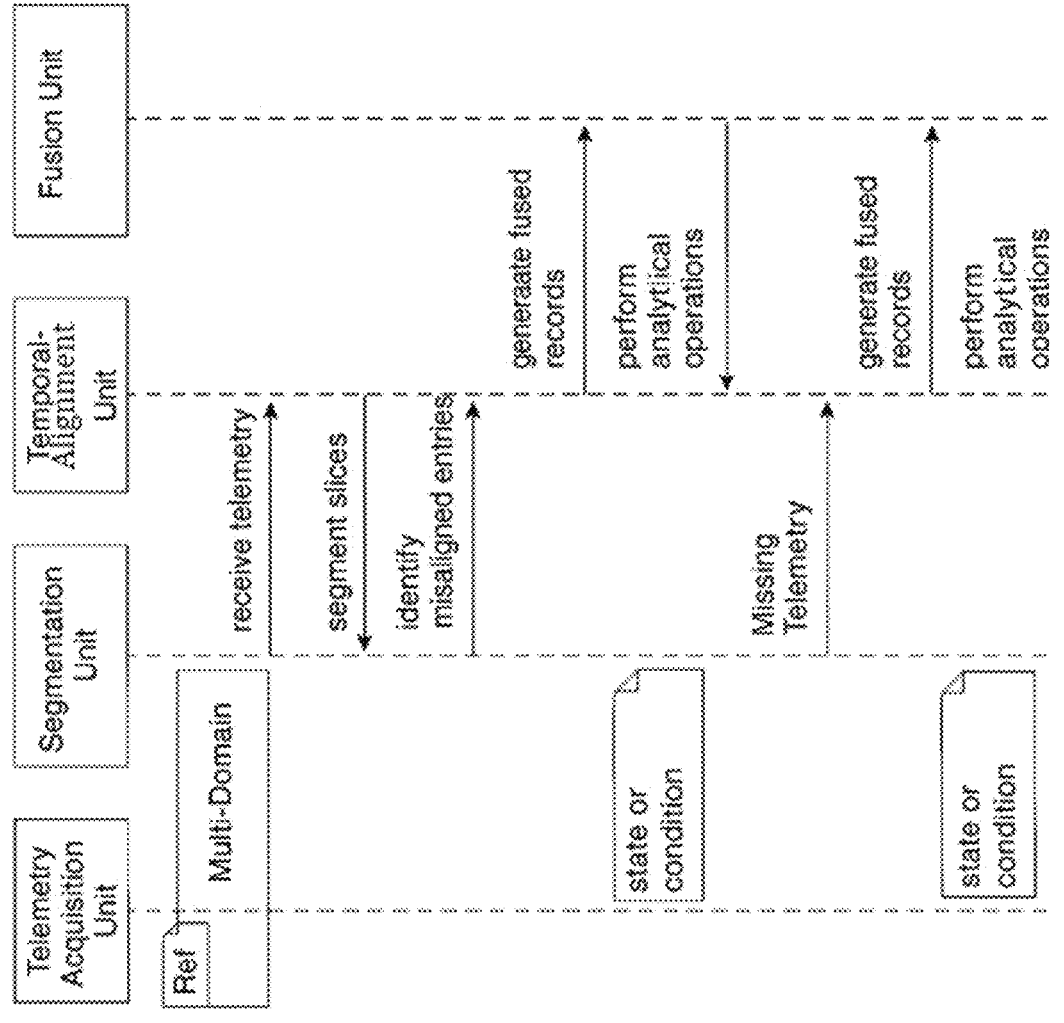
FIG. 3 depicts the smart-city telemetry-processing workflow in which raw heterogeneous telemetry first arrives at the Telemetry Acquisition Unit, which acts as the ingress point for high-frequency signals originating from different smart-city subsystems.

FIG. 3 depicts the smart-city telemetry-processing workflow in which raw heterogeneous telemetry first arrives at the Telemetry Acquisition Unit, which acts as the ingress point for high-frequency signals originating from different smart-city subsystems. The incoming telemetry is passed to the Segmentation Unit, where the system executes the receive telemetry operation to pull continuous data streams into a controlled preprocessing buffer. From here, the Segmentation Unit carries out segment slices, a transformation in which the continuous telemetry stream is partitioned into temporally bounded slices based on subsystem timestamps and observed sample arrival intervals. These slices are then evaluated through identify misaligned entries, where the Segmentation Unit compares the internal timestamps of each slice against the expected temporal sequence and flags entries whose timing deviates from the permissible drift margin; these flagged entries are forwarded to the Temporal-Alignment Unit, which uses its alignment logic to reconstruct proper ordering and ensure temporal consistency before fusion occurs. Once the Temporal-Alignment Unit resolves misalignments, it issues a generate fused records operation toward the Fusion Unit, where subsystem-specific fields from the aligned slices are combined into structured fused records enriched with identifiers, correlation markers, and boundary-limit indicators. The Fusion Unit subsequently executes perform analytical operations, a step that applies representation computations, dependency evaluations, and anomaly-inference routines on the fused records to derive higher-order analytical signatures. When the Segmentation Unit detects data discontinuities, it sends a Missing Telemetry notification to the Temporal-Alignment Unit, prompting a second execution of generate fused records, which incorporates interpolated or reconstructed data to preserve continuity; this is again followed by perform analytical operations at the Fusion Unit to integrate reconstructed content into the analytics pipeline. The state or condition notes shown in the margins indicate that certain telemetry states—such as misalignment, partial loss, or subsystem-specific anomalies—trigger conditional operations within each unit, ensuring that the pipeline adapts its segmentation, alignment, and fusion logic based on real-time data states. Together, the coordinated execution of receive telemetry, segment slices, identify misaligned entries, generate fused records, perform analytical operations, and Missing Telemetry handling forms a deterministic multi-unit processing cycle that transforms raw smart-city telemetry into time-aligned, analytically enriched fused records ready for downstream ledger-behavior adaptation.\

In one embodiment, the sequence illustrated in FIG. 3 captures the complete flow of smart-city telemetry from raw acquisition to its transformation into internal representation values used for adaptive ledger behavior. The process begins with heterogeneous telemetry arriving at the Telemetry Acquisition Unit, which receives asynchronous and independently clocked packets from transportation systems, energy infrastructure, public-safety streams, and environmental monitors. Each packet contains at least a timestamp, subsystem identifier, payload, and optional quality metadata. The system's segmentation logic divides these packets into temporally bounded slices, using a stable slice-index counter that increments upon each boundary crossing. This operation establishes a deterministic temporal structure that enables downstream reasoning without clock drift or packet jitter interference. The Temporal Alignment Unit constructs a dynamic alignment table by comparing timestamps across subsystems. It calculates drift coefficients using short-window linear approximations and stores offset values that map slices between domains such that slice N in transportation can be aligned with an equivalent point in the energy system. Missing and misaligned data detection relies on comparing expected timestamps from the alignment table against actual timestamps in observed packets. If deviations exceed preset tolerances, the system flags the slice for reconstruction. The Temporal Alignment Unit reconstructs missing or corrupted values using data-type-specific interpolation rules stored in memory. Instantaneous metrics (grid frequency, PM2.5 levels) use linear interpolation between nearest valid values; count-based metrics (public-safety reports, vehicle counts) use forward or backward hold rules. Crucially, reconstructed values store provenance metadata that later influences anomaly detection and privacy-sensitivity scoring.

Once slices are normalized and repaired, the Fusion Unit merges subsystem telemetry into a fused multi-field record. Slot positions correspond to predefined fields in a mapping table; for instance, position zero encodes traffic density, position one stores average speed class, positions two and three store grid frequency and load, while positions four through six carry safety event counts and environmental measures. Correlation markers quantify cross-subsystem relationships and boundary flags identify policy-relevant threshold violations. This fused record forms a high-dimensional, semantically rich snapshot of the city's operational state.

The AI Analytical Unit applies a multi-stage weighted transform sequence over sliding windows of fused records. Each layer computes activations derived from a set of weights and temporal dependencies. These activations form intermediate representations that encode structural relationships between transportation behavior, grid stability, safety events, and environmental patterns. A baseline pattern library stored in analytical memory buffers enables the system to compute discrepancy vectors and adapt transformation weights, producing refined internal representation values. These values summarize anomaly magnitude, privacy sensitivity, and workload progression in a compact state vector. The technical effect of this pipeline is a temporally coherent, cross-domain fused representation enabling far more accurate and higher-granularity anomaly detection, privacy tagging, and scalability analysis compared with naive aggregation. The advancement lies in fully reconstructing multi-domain telemetry with alignment intelligence and embedding cross-system metadata directly into the analytical flow. This ensures that downstream ledger configuration logic operates on precise and contextually relevant information rather than noisy or misaligned sensor data.

Figure 4:
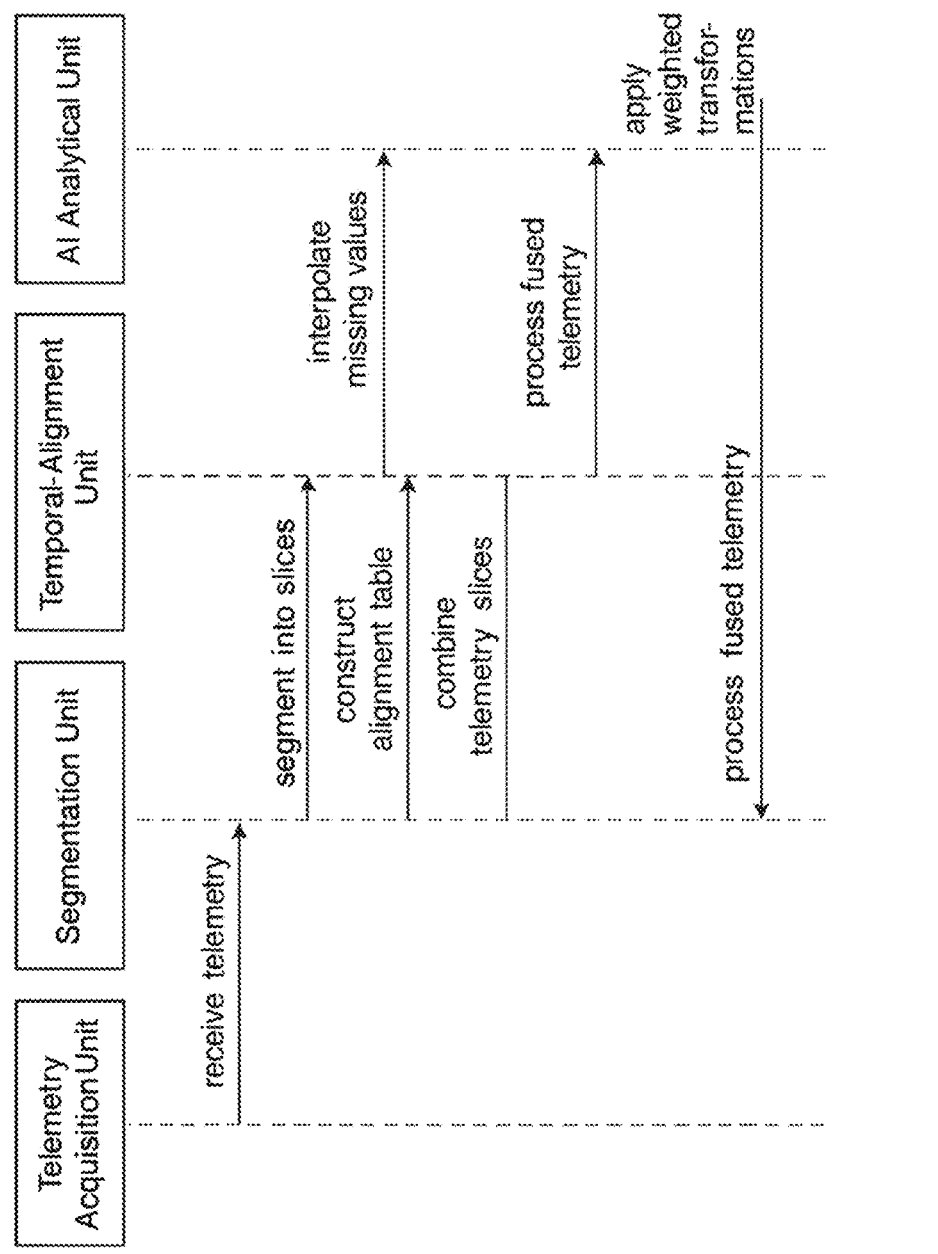
FIG. 4 illustrates the sequential telemetry-processing workflow in which the Telemetry Acquisition Unit acts as the initial entry point for heterogeneous smart-city telemetry and executes the receive telemetry operation to capture raw, time-stamped measurements arriving from multiple subsystems.

FIG. 4 illustrates the sequential telemetry-processing workflow in which the Telemetry Acquisition Unit acts as the initial entry point for heterogeneous smart-city telemetry and executes the receive telemetry operation to capture raw, time-stamped measurements arriving from multiple subsystems. These measurements are handed to the Segmentation Unit, which first performs segment into slices, partitioning the incoming stream into discrete, temporally bounded segments based on observed sampling intervals and encoded subsystem timestamps. Once slicing is complete, the Segmentation Unit issues construct alignment table to the Temporal-Alignment Unit, prompting the creation of a cross-timestamp reference structure used to detect discontinuities, reorder out-of-sequence slices, and compute drift-corrected temporal coordinates for each segment. After this alignment table is constructed, the Temporal-Alignment Unit identifies regions of discontinuity and executes interpolate missing values, applying reconstruction logic that derives replacement values by examining neighboring slices, rate-of-change characteristics, and domain-specific continuity constraints. The alignment results are then returned to the Segmentation Unit through combine telemetry slices, where the corrected slices and interpolated values are merged into unified, chronologically consistent composite slices. These composite slices are forwarded to the AI Analytical Unit, which executes process fused telemetry, a step involving normalization of field magnitudes, construction of high-dimensional analytical representations, and extraction of relational patterns that reflect risk, load, anomaly intensity, and contextual interactions between subsystems. After deriving these analytical representations, the AI Analytical Unit performs apply weighted transformations, applying context-dependent numerical weighting influenced by sensitivity gradients, dependency assessments, and analytical-score profiles. This weighted transformation step yields refined internal vectors that feed downstream decision-generation components outside the scope of this figure. By coupling receive telemetry, segment into slices, construct alignment table, interpolate missing values, combine telemetry slices, process fused telemetry, and apply weighted transformations in a deterministic chain, the architecture ensures that raw telemetry is reliably segmented, temporally normalized, structurally fused, and analytically conditioned, thereby preparing it for precise and context-aware ledger behavior adaptation in subsequent stages of the system.

Figure 5:
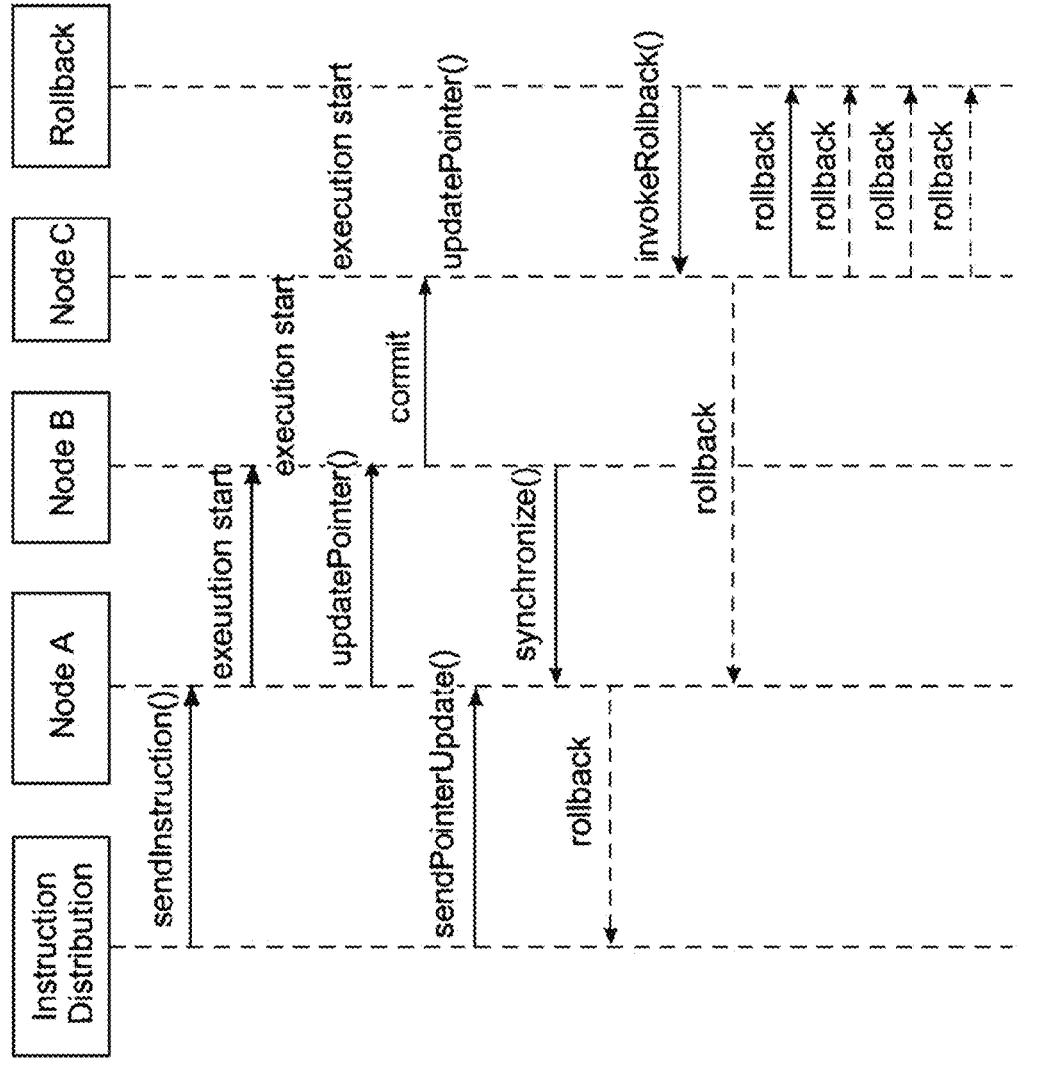
FIG. 5 illustrates the distributed execution cycle in which an Instruction Distribution component coordinates the behavior of Node A, Node B, Node C, and a Rollback Unit through a sequence of instruction-level, pointer-level, and recovery-level message exchanges.

FIG. 5 illustrates the distributed execution cycle in which an Instruction Distribution component coordinates the behavior of Node A, Node B, Node C, and a Rollback Unit through a sequence of instruction-level, pointer-level, and recovery-level message exchanges. The process begins when Instruction Distribution issues sendInstruction( ), delivering an ordered instruction stream to Node A, which immediately transitions into execution start, initiating its local execution pipeline. Node B and Node C begin their own execution start sequences shortly thereafter, reflecting a distributed commencement of parallel instruction processing. As Node C progresses, it invokes updatePointer( ), adjusting its instruction pointer to reflect advancement to the next execution boundary, after which it continues with execution( ) to apply the operation defined at the newly updated pointer. Node B then performs its own update-Pointer( ) followed by a commit message that signals to the Instruction Distribution module that it has reached a stable execution boundary suitable for synchronization with other nodes. In response, Instruction Distribution sends send-PointerUpdate( ) to Node A and Node B, instructing them to shift their execution pointers to maintain deterministic alignment; Node A responds with its local updatePointer( ), ensuring its pointer advancement occurs in lockstep with the system-wide pointer correction issued by the distribution layer. After pointer realignment, Node B issues synchronize( ), informing the coordinating layer that its execution view is now consistent with the pointer update. During this process, Node C independently continues its pointer advancement, ensuring that all nodes eventually converge toward a coherent execution boundary. If an inconsistency is detected—such as a pointer divergence, incorrect state transition, or anomaly during segment execution—Instruction Distribution triggers a recovery phase by sending rollback to Node A and rollback to Node B in dashed control messages, signaling that execution must revert to the most recent safe checkpoint. At the same time, Node C communicates with the Rollback Unit, invoking invokeRollback( ) to initiate the generation and distribution of rollback directives. The Rollback Unit then issues a series of rollback operations to each node, ensuring that Node A, Node B, and Node C all revert their local execution states, pointer positions, and buffered results to a stable pre-fault state. Multiple rollback messages are shown in the diagram to indicate the layered and sequential nature of distributed rollback propagation, where each node acknowledges and applies incremental rollback steps until all execution contexts are restored to consistency. Through these operations—sendInstruction( ), execution start, updatePointer( ), execution( ), commit, sendPointer-Update( ), synchronize( ), invokeRollback( ), and the chained rollback messages—the system enforces deterministic multi-node execution, precise pointer alignment, and coordinated fault-recovery behavior, ensuring that distributed instruction processing remains coherent, recoverable, and temporally aligned across all participating nodes.

FIG. 6 illustrates a table depicting the temporal variation of four critical telemetry parameters—Sensor Fusion Delay, AI Anomaly Score, Privacy Sensitivity Level, and Ledger Update Latency—across indexed time windows T01 to T10. The values indicate strong non-linear fluctuations that reveal system dynamics under varying load conditions.

Sensor Fusion Delay shows significant oscillation from a low of 38.868 ms (T02) to a high of 92.401 ms (T10). The early windows (T01-T04) maintain moderate delays between 38-50 ms, suggesting stable data arrival and fusion cycles. However, sharp spikes are observed at T06 (86.896 ms) and T10 (92.401 ms), indicating periods where smart-city telemetry streams likely arrived in a congested or desynchronized manner. These elevated delays suggest fusion bottlenecks or temporary sensor-network strain.

AI Anomaly Score fluctuates between 0.185 (T09) and 0.900 (T10). In the mid-interval region (T03-T05), anomaly scores rise steadily from 0.480 to 0.604, suggesting gradual pattern intensification or emerging deviations in telemetry. The sudden drop at T09 (0.185) indicates a transient stabilization period, before an abrupt surge to 0.900 at T10, marking the strongest anomaly signal in the table. Such contrast underscores how anomaly events form, dissipate, and re-emerge dynamically.

Privacy Sensitivity Level ranges widely from 0.051 (T02) to 0.819 (T09). The extremely low sensitivity values at T02 (0.051) and T08 (0.092) imply minimal personal-data exposure or low-risk metadata patterns during these windows. In contrast, levels exceed 0.75 at T03 (0.797) and T09 (0.819), demonstrating windows where incoming telemetry streams contained attributes with higher identification-risk characteristics. The alternating high-low pattern suggests that privacy-relevant information is not constant but fluctuates with subsystem activity.

Ledger Update Latency varies significantly from 57.980 ms (T10) to a peak of 157.190 ms (T02). The extremely high latency at T02 corresponds with one of the lowest privacy sensitivity levels and comparatively moderate fusion delay, indicating that ledger congestion or validation queue saturation—not privacy or fusion complexity—caused the slowdown. Conversely, the lowest latency at T10 (57.980 ms) occurs despite the highest anomaly score (0.900) and highest fusion delay, suggesting rapid ledger adjustment cycles or optimized validation path responses under high-alert conditions. Mid-range latencies between 86-132 ms (T05-T09) show semi-stable behavior, aligning with moderate anomaly and privacy values. The table highlights how telemetry parameters fluctuate independently yet influence overall system behavior. High fusion delays do not always coincide with high ledger latencies; peaks in anomaly scores do not consistently align with privacy sensitivity spikes. This multi-dimensional pattern demonstrates the complex interplay between sensing, analysis, risk scoring, and blockchain update timing across sequential telemetry windows.

FIG. 7 illustrates a table depicting the temporal progression of four operational parameters—Traffic Density, Energy Grid Load, Emergency Alerts, and Pollution Spike Index—across windows W01 to W12. The values exhibit strongly varying behavioral patterns that reveal system stress, subsystem interaction, and environmental fluctuation trends.

Traffic Density ranges from a low of 50 vehicles (W03) to a peak of 170 vehicles at W06, showing that vehicular load expands more than threefold across the window set. High-density periods appear at W01 (93), W04 (97), W09 (115), W10 (83), and surge dramatically at W06 (170) and W12 (140), indicating congestion clusters or peak-traffic shocks. Conversely, intervals such as W03 (50) and W08 (54) show relatively smooth flow. The oscillation between dense and sparse intervals demonstrates instability in traffic flow, likely influenced by event-driven or time-dependent factors.

Energy Grid Load (%) fluctuates between 45.046% (W06) and 88.054% (W02). Higher load conditions are observed at W02 (88.054%), W07 (80.545%), W10 (81.843%), reflecting periods where power consumption or grid stress increases. Mid-range loads such as W04 (68.95%) and W05 (70.869%) indicate moderately balanced demand. The lowest loads occur at W06 (45.046%) and W12 (49.985%), suggesting reduced energy consumption or a relief phase in grid strain.

Emergency Alerts show sharp fluctuation from 0 alerts (W07) to 11 alerts (W03 and W11). High-alert conditions are concentrated around W03, W08, W11, indicating localized periods where public-safety sensors recorded abnormal or urgent events. The absence of alerts at W07 is notable since it coincides with high grid load and high pollution (1.328), implying that environmental spikes may occur without triggering safety alarms. Sudden shifts between high-alert and low-alert states reflect irregular safety-event clustering.

Pollution Spike Index ranges from 0.217 (W06) to 1.333 (W03), showing more than a sixfold variability. Very high pollution events appear at W03 (1.333), W07 (1.328), W05 (1.25), and W11 (1.066), highlighting episodes of severe environmental degradation. Moderate spikes occur at W08

(0.798), W09 (0.875), W10 (0.765), whereas much lower readings at W02 (0.284) and W06 (0.217) indicate clear-air periods.

Across W01-W12, no single parameter peaks consistently in the same window, demonstrating independent subsystem variability. For example, W06 shows highest traffic density (170) but lowest pollution (0.217) and lowest grid load, showing non-linear cross-domain correlation. W03 combines low traffic (50) with high pollution (1.333) and maximum alerts (11), suggesting a localized non-traffic-related environmental intrusion. Such contrasting behavior patterns across parameters show the complexity of urban telemetry and the need for dynamic multi-domain monitoring.

Figures 8, 9:
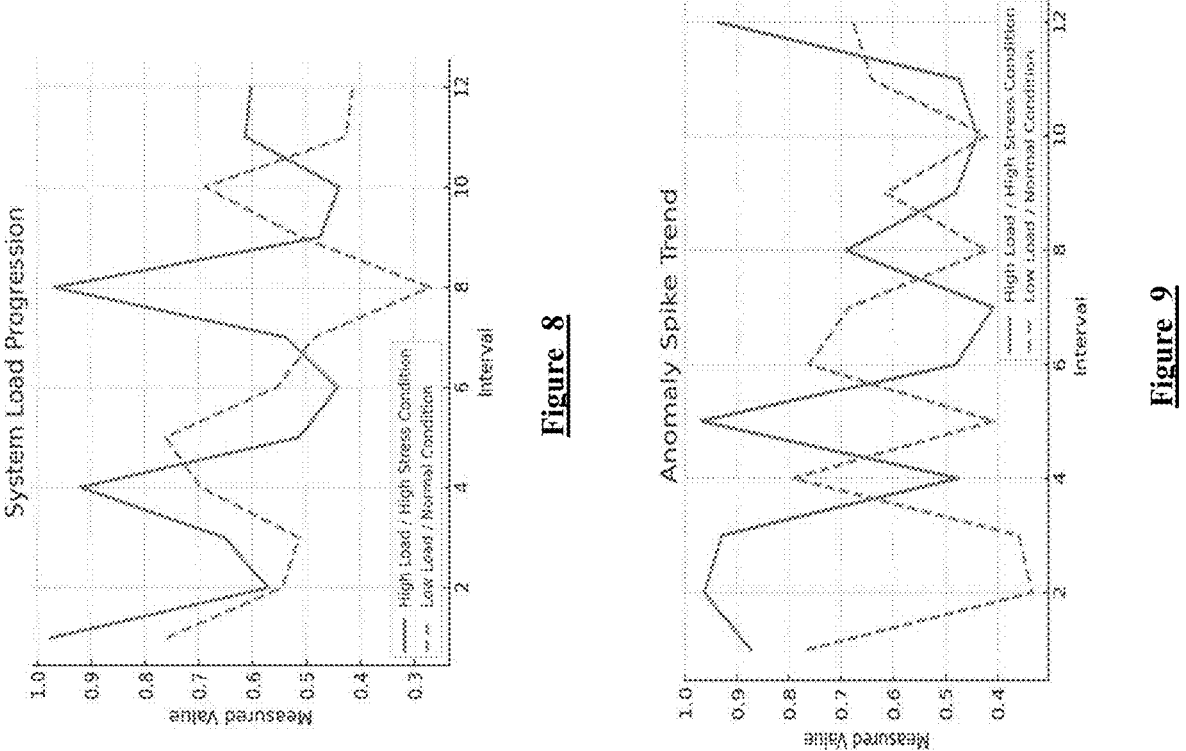
FIG. 8 illustrates a line chart depicting the progression of measured system load across twelve sequential intervals.
FIG. 9 illustrates the variation in anomaly intensity across twelve sequential intervals under two operational states.

FIG. 8 illustrates a line chart depicting the progression of measured system load across twelve sequential intervals under two operational states: a high-load/high-stress condition (solid orange line) and a low-load/normal condition (dashed red line). The two curves show distinctly different amplitude patterns, indicating how the system behaves under varying stress levels.

The high-load curve begins at a very elevated value, close to 0.98 at Interval 1, before dropping sharply to approximately 0.56 at Interval 2, indicating an abrupt reduction in system pressure. It then rises gradually through Intervals 3 (≈0.63) and 4 (≈0.92), forming a prominent local peak. A steep decline follows, reaching its lowest region between Intervals 5-7, with values fluctuating between 0.51 and 0.45, highlighting a temporary stabilization phase. A dramatic spike occurs at Interval 8, where the curve surges to nearly 0.97, representing the highest measured stress aside from Interval 1. This is followed by another drop to around 0.49 at Interval 9, and moderate oscillation thereafter, with values near 0.46 (Interval 10), 0.61 (Interval 11), and 0.60 (Interval 12), suggesting partial recovery and stabilization toward the end.

In contrast, the normal-load curve shows milder fluctuations with significantly lower peak amplitudes. It starts at roughly 0.75 at Interval 1 and declines steadily to around 0.54 (Interval 2) and 0.52 (Interval 3). A gradual increase is observed across Intervals 4-5, reaching ≈0.76 at Interval 5. A downward trend follows into Intervals 6-8, where values reach their minimum of approximately 0.28 at Interval 8, indicating the lowest relative system load. The curve rises again to ≈0.69 at Interval 10, forming a secondary peak, before tapering off to ≈0.43 by Interval 12.

When comparing both curves, the high-load condition consistently exhibits sharper spikes, deeper troughs, and higher overall variance than the normal-load condition. The largest divergence occurs at Intervals 1, 4, and 8, where the high-load curve is significantly above the normal-load curve. In mid-range intervals (5-7), the two curves momentarily converge before diverging again in Intervals 8-12. These contrasting patterns illustrate the system's tendency to experience rapid stress surges and nonlinear stability under heavy operational load, whereas the normal-load pathway remains relatively smoother, more predictable, and lower in magnitude across the entire interval set.

FIG. 9 illustrates the variation in anomaly intensity across twelve sequential intervals under two operational states—High Load/High Stress Condition (solid orange line) and Low Load/Normal Condition (dashed red line). The two curves display markedly different volatility and amplitude patterns, highlighting how anomaly behaviour evolves under distinct system conditions.

Under the high-stress condition, the anomaly values begin at a relatively elevated level near 0.87 at Interval 1, before climbing sharply to a local maximum of approximately 0.96 at Interval 2. This peak is followed by a slight decline at Interval 3 and then a steep drop to about 0.48 at Interval 4, indicating a sudden reduction in anomaly intensity. The curve immediately rebounds, surging to nearly 0.98 at Interval 5, which represents one of the highest anomaly spikes in the entire sequence. Between Intervals 6-8, the values fluctuate between 0.48, 0.42, and 0.69, illustrating alternating periods of suppressed and heightened anomaly activity. After another dip around Interval 9 ($\approx$0.46) and Interval 10 ($\approx$0.44), the curve rises steadily through Intervals 11 ($\approx$0.48) and 12 ($\approx$0.95), ending with a sharp spike that signifies a renewed instability or stress surge.

In contrast, the normal-load condition follows a comparatively smoother but clearly reactive pattern. The curve starts high at $\approx$0.76 (Interval 1), then drops sharply to its lowest region around 0.33-0.36 during Intervals 2-3. A strong upward swing occurs at Interval 4 ($\approx$0.79), after which the curve cycles downward to $\approx$0.41 (Interval 5) and back up again to $\approx$0.76 (Interval 6). This alternating behaviour persists, with values settling into mid-range levels around 0.69 (Interval 7), dipping to $\approx$0.43 (Interval 8), rising to $\approx$0.61 (Interval 9), and then falling briefly at Interval 10 ($\approx$0.42). The curve concludes with a gradual climb at Intervals 11 ($\approx$0.66) and 12 ($\approx$0.68).

Comparing the two curves reveals distinct behavioural differences. The high-stress curve exhibits far more dramatic swings—large spikes, deep troughs, and abrupt oscillations—indicating unstable anomaly formation under heavy load. By contrast, the normal-condition curve fluctuates within a narrower band and shows a more cyclical pattern. The most significant separations between the two curves occur at Intervals 2, 5, and 12, where high-stress anomalies surpass normal-condition values by large margins. Meanwhile, at Intervals 8 and 10, the values nearly converge, suggesting transient periods where the system behaves similarly regardless of load. The chart demonstrates how anomaly intensity escalates, stabilizes, collapses, and recovers differently across varying operational states, capturing the dynamic and non-linear nature of anomaly propagation.

The disclosed invention is applicable to smart-city infrastructure management, autonomous blockchain governance, urban mobility coordination, distributed environmental monitoring, adaptive digital-identity frameworks, and secure multi-agency data governance ecosystems.

The invention claimed is:

1. A computer-implemented method for processing a smart-city telemetry to generate and adapt blockchain ledger behavior through AI-based analytical operations, the method comprising:

receiving the smart-city telemetry originating a plurality of subsystems of a smart-city infrastructure and converting the smart-city telemetry received into an organized digital structure by aligning time-indexed entries, associating subsystem identifiers with each entry, and generating consolidated multi-field telemetry records;

processing the organized digital structure through an AI-based analytical sequence that applies successive weighted computational operations to derive internal representation values that characterize security-relevant deviations, privacy-relevant sensitivity indicators, and scalability-relevant workload progressions;

generating multiple candidate ledger-configuration sets, each configuration set including timing-control fields, validation-control fields, authorization-control fields, and data-handling-control fields, and evaluating the candidate ledger-configuration sets by comparing at least a portion of the internal representation values against configuration-set fields;

selecting one of the candidate ledger-configuration sets based on the evaluation and generating blockchain ledger behavior instructions by interpreting software-engineering specifications, extracting conditional execution descriptions, mapping the conditional execution descriptions to state-adjustment structures, and encoding the state-adjustment structures into machine-interpretable instruction sequences; and deploying the machine-interpretable instruction sequences across distributed processing nodes of a blockchain infrastructure, receiving execution telemetry from the distributed processing nodes, and modifying at least one ledger-configuration field or instruction-sequence ordering based on comparisons between the execution telemetry and updated internal representation values produced by the AI-based analytical sequence, wherein converting the smart-city telemetry received into the organized digital structure comprises executing, under control of a processor, a multi-stage data restructuring procedure that includes initially segmenting an incoming telemetry into temporally bounded slices according to subsystem timestamps, assigning to each telemetry slice an index generated from a monotonically incrementing counter, constructing an intermediate alignment table by comparing timestamps of slices across the plurality of subsystems of the smart-city infrastructure, interpolating missing values in the slices by referencing nearest-neighbor slices within the intermediate alignment table, combining subsystem-specific values into fused multi-field telemetry records by applying predetermined positional mapping rules, and generating a consolidated structure that stores, for each temporal position, a fused record comprising a plurality of subsystem identifiers, numerical measurements, boundary-limit flags, and correlation markers, and wherein processing the organized digital structure through the AI-based analytical sequence comprises applying a layered transformation workflow that includes receiving the fused multi-field telemetry records as input, distributing the consolidated multi-field telemetry records across successive computational layers, at each layer calculating transformed values by combining weighted contributions from a preceding layer, generating intermediate activation sets that represent inferred patterns in security anomalies, privacy characteristics, and load fluctuations, iteratively updating the weights associated with the layers based on gradient-like adjustments computed from discrepancies between current activation sets and reference pattern libraries stored in an analytical memory structure, and producing, as final outputs of the layered transformation workflow, internal representation values stored in a representation array accessible to the evaluation of ledger-configuration sets, and wherein mapping the conditional execution descriptions to the state-adjustment structures comprises detecting conditional triggers encoded within the internal representation values, generating trigger identifiers by associating each conditional trigger with an execution priority indicator, determining permissible state adjustments for each trigger identifier by referencing predetermined state-transition rules stored in a transition rulebase, assembling a multi-entry list of state adjustments ordered according to execution priority indicators, and validating the multi-entry list by executing a simulated traversal of the state adjustments to detect invalid or cyclic transitions and removing entries that violate traversal correctness constraints, and wherein encoding the state-adjustment structures into the machine-interpretable instruction sequences comprises converting each validated state-adjustment entry into a multi-byte instruction pattern including an operation code portion, an operand portion, and a boundary-check segment, assigning an execution pointer to each instruction pattern by calculating sequential offsets from a base memory address, linking the instruction pattern by setting the execution pointer of each pattern to the next sequential offset, inserting synchronization markers at predetermined pointer positions corresponding to transitions between subsystem contexts, and generating a contiguous instruction stream by concatenating all pointer-linked instruction patterns.

2. The method of claim 1, wherein modifying the instruction-sequence ordering comprises computing load-intensity values from the internal representation values being updated, identifying instruction segments having high load-sensitivity scores by comparing the instruction segments to the load-intensity values, generating a reordering index for each load-sensitive segment, adjusting pointer offsets of the load-sensitive segment according to reordering indices, and producing a reordered instruction stream with updated pointers that reflect a revised execution order, and wherein generating the candidate ledger-configuration sets comprises constructing, for the each configuration set, a multi-field structure including the timing-control fields, the validation-control fields, the authorization-control fields, and the data-handling-control fields, and further performing controlled mutation operations on each of the multi-field structure by applying, to each field, a mutation rule specifying allowable directional adjustments, minimum and maximum magnitudes, and inter-field consistency constraints; and wherein each mutated configuration set is stored as a row entry in a configuration matrix, the configuration matrix being subsequently used by an evaluation procedure.

3. The method of claim 1, wherein evaluating the candidate ledger-configuration sets comprises retrieving, for the each configuration set, the timing-control fields, the validation-control fields, the authorization-control fields, and the data-handling-control fields, computing a relevance vector by selecting portions of the internal representation values corresponding to security deviation intensities, privacy sensitivity weights, and workload-progression markers, applying a comparison procedure that subtracts the relevance vector from fields of each configuration set to generate a configuration-deviation profile, comparing elements of the configuration-deviation profile with acceptance ranges stored in a configuration-reference structure, and designating the configuration set whose configuration-deviation profile most closely satisfies the acceptance ranges as a selected configuration set.

4. The method of claim 1, wherein modifying the ledger-configuration field comprises computing the internal representation values being updated from a normalized execution telemetry by reprocessing the telemetry through the AI-based analytical sequence, deriving adjustment indicators by comparing the updated internal representation values with a previously stored representation set, selecting a ledger-configuration field whose current entries diverge from the adjustment indicators beyond stored deviation thresholds, calculating a new field value by applying a proportional modification rule derived from the adjustment indicators, and overwriting the ledger-configuration field with the new field value for use in subsequent execution cycles.

5. The method of claim 1, wherein characterizing security-relevant deviations in the AI-based analytical sequence further comprises isolating anomaly signatures by computing inter-interval deviations of telemetry values, assigning anomaly scores to fields whose deviations surpass reference thresholds stored in a security-state library, propagating the anomaly scores through a weighted computational layers to produce amplified anomaly indicators, and embedding the amplified anomaly indicators into the internal representation values for configuration-set evaluation, and wherein computing privacy-relevant sensitivity indicators within the AI-based analytical sequence comprises detecting the fields that exhibit repeated or identity-indicative access patterns by measuring access frequency, comparing the access frequency with stored privacy-constraint limits, calculating sensitivity scores based on comparisons, propagating the sensitivity scores through subsequent layers of the AI-based analytical sequence, and tagging state-adjustment entries whose mapped fields exceed the sensitivity scores with masking identifiers used during instruction encoding.

6. The method of claim 1, wherein extracting scalability-relevant workload progressions comprises computing sequential load increments by comparing fused telemetry vectors from adjacent time intervals, determining escalation magnitudes by identifying intervals where the sequential load increments exceed an escalation boundary stored in a scalability reference set, propagating the escalation magnitudes through analytical layers to generate workload progression indicators, and integrating the workload progression indicators into the internal representation values that influence selection of the candidate ledger-configuration sets.

7. The method of claim 1, wherein generating the fused multi-field telemetry records in the organized digital structure further comprises computing subsystem-balance weights across the plurality of subsystems of the smart-city infrastructure, applying the subsystem-balance weights to normalize each subsystem's contribution to the fused record, inserting subsystem-correlation values that reflect correlation strength among the environmental categories, and storing the fused multi-field telemetry records that are normalized as entries in an unified structure, and wherein updating the internal representation values using execution telemetry comprises generating telemetry slices from raw telemetry logs, assigning slice identifiers based on elapsed operational intervals, converting each slice into a standardized record through time scaling and unit normalization, feeding a standardized record into analytical layers to generate updated representation patterns, and merging each updated representation pattern with a stored pattern set by applying a progressive weighting schedule.

8. The method of claim 1, further comprises adjusting instruction-sequence ordering based on the execution telemetry comprises computing new execution-order weights for each instruction segment from updated representation patterns, assembling a weighted dependency graph among instruction segments, executing a topological sorting procedure on the weighted dependency graph to derive an optimized execution sequence, and rewriting pointer offsets of the instruction-sequence adjusted according to the optimized execution sequence, and wherein modifying ledger-configuration fields based on updated internal representation values comprises identifying configuration deviations by detecting mismatches between updated representation patterns and stored field values, determining a magnitude of deviation for each mismatching field, computing a corrective field value by applying a deviation-based adjustment factor, and replacing a mismatching field value with the corrective field value before generating a next configuration cycle.

9. The method of claim 1, wherein deriving the internal representation values includes computing domain influence distributions by comparing contributions of the plurality of subsystems of the smart-city infrastructure within fused telemetry vectors, adjusting the domain influence distributions by applying a balance-index calculation, and storing resulting domain-balanced representation values for use in configuration evaluation, and wherein generating blockchain ledger behavior instructions from the software-engineering specifications further comprises computing domain-context mappings by associating each specification segment with a specific smart-city domain, adjusting the state-adjustment structures to reflect associated domain-context mappings, modifying pointer configurations to enforce domain-based execution boundaries, and embedding the domain-context mappings into an encoded instruction sequence for execution by distributed processing nodes.

10. The method of claim 1, wherein processing the smart-city telemetry in the AI-based analytical sequence further comprises identifying outlier telemetry points by computing an intra-interval deviation score for each fused multi-field record, comparing the intra-interval deviation score to deviation boundaries stored in a telemetry integrity table, flagging all records with deviation scores outside the deviation boundaries, generating reconstructed values for the records that are flagged by interpolating between adjacent non-flagged records within same subsystem, reinserting the reconstructed values into the organized digital structure, and propagating reconstructed structured values through the layered transformation workflow to ensure that the internal representation values incorporate corrected telemetry input rather than raw outlier values.

11. The method of claim 1, wherein computing privacy-relevant sensitivity indicators in the AI-based analytical sequence comprises assigning preliminary privacy-classification weights to telemetry fields based on stored classification rules, inserting classification weights into selected positions of a transformation sequence, propagating classification weights layer-by-layer while computing combination values between the classification weights and intermediate transformation outputs, generating updated privacy-sensitivity indicators by comparing propagated combination values with stored privacy escalation limits, and storing the updated privacy-sensitivity indicators as part of the internal representation values used for evaluating ledger-configuration sets.

12. The method of claim 1, wherein characterizing security-relevant deviations further comprises generating a security event gradient for each telemetry interval by computing monotonically incrementing differences between anomaly-related features extracted from successive fused records, propagating the security event gradient across multiple layers of the AI-based analytical sequence by repeatedly updating weight parameters based on gradient's magnitude and direction, combining the security event gradient into a cumulative security pattern vector, and inserting the cumulative security pattern vector into the internal representation values employed during ledger-configuration evaluation, and wherein generating the candidate ledger-configuration sets further comprises executing a multi-stage mutation pipeline that includes creating a baseline configuration set, generating first-stage mutated sets by adjusting timing-control fields within allowed temporal boundaries, generating second-stage mutated sets by adjusting validation-control and authorization-control fields according to stored dependency constraints, combining first-stage and second-stage mutated sets by merging compatible mutated entries, validating the sets being merged against inter-field consistency tables, and storing all validated merged sets as candidate configuration rows within a configuration matrix.

13. The method of claim 1, wherein evaluating the candidate ledger-configuration sets further comprises generating a cross-representation matching vector by selecting from the internal representation values those entries associated with security deviations, privacy sensitivity markers, and workload progressions, computing a match-difference vector between the cross-representation matching vector and the each configuration set, determining match-strength scores by applying weighted combination operations to the match-difference vector, and selecting the configuration set whose match-strength score is nearest to a predefined evaluation threshold stored in a configuration evaluation range, and wherein interpreting the software-engineering specifications comprises performing extended constraint propagation by scanning all hierarchical identifiers for both direct and indirect dependency indicators, generating a dependency expansion table that enumerates each identifier's downstream impact on other identifiers, inserting expanded dependency indicators into constraint-enriched representations, and resolving conflicting constraint paths by applying a consistency-checking procedure that retains only those constraints that maintain structural coherence across an expanded table.

14. The method of claim 1, wherein encoding the state-adjustment structures further comprises generating an integrity-aware instruction stream by inserting a multi-byte integrity marker before and after instruction segments derived from high-sensitivity or high-impact state adjustments, computing an integrity-sequence index for each such segment, associating the index with pointer offsets for runtime verification, and combining integrity-marked segments with non-marked segments into a finalized continuous instruction stream that includes integrity markers embedded at each designated boundary, and wherein modifying the instruction-sequence ordering comprises computing adaptive realignment values from execution telemetry by extracting latency fluctuations, load distribution irregularities, and cross-node timing variations, comparing extracted values with realignment boundaries stored in a state-alignment reference table, generating updated execution-order indices for instruction segments affected by the latency fluctuations, and reconstructing the machine-interpretable instruction sequences by inserting instruction segments at index positions corresponding to the updated execution-order indices.

15. The method of claim 1, wherein extracting conditional execution descriptions comprises executing a multi-phase trigger consolidation operation that includes detecting all trigger expressions across segmented specifications, grouping the trigger expressions based on shared domain context or identical conditional fields, computing a consolidated expression for each group by merging overlapping conditional fields, generating consolidated trigger identifiers for each merged group, and replacing original trigger references with the consolidated trigger identifiers prior to mapping to state-adjustment structures, and wherein modifying ledger-configuration fields comprises computing configuration evolution values by retrieving representation patterns from multiple prior execution intervals, measuring cross-interval deviations between stored patterns and updated patterns, generating evolution weights by applying progressive scaling factors to the cross-interval deviations, computing evolution-adjusted field values by combining the evolution weights with current ledger-configuration values, and updating the ledger-configuration field with the evolution-adjusted field values for use in subsequent operation cycles.

16. The method of claim 1, wherein processing the smart-city telemetry further comprises executing a telemetry preconditioning sequence that includes identifying discontinuities in the time-indexed entries by computing temporal difference between successive fused telemetry records, classifying each discontinuity according to a discontinuity-type table stored in memory, generating a repair directive for each classified discontinuity by selecting a corrective interpolation rule that corresponds to an assigned discontinuity type, computing replacement values using a selected interpolation rule by referencing at least two earlier and two later fused telemetry records, inserting each computed replacement value into the organized digital structure in place of original discontinuous value, and forwarding the digital structure being preconditioned to the AI-based analytical sequence to ensure the layered transformation workflow operate on temporally consistent and corrected telemetry inputs.

17. The method of claim 1, wherein generating the internal representation values further comprises executing a sequential multi-stage transformation process in which the processor, at a first stage, forms an initial feature vector by selecting predetermined fields from the organized digital structure and combining them using stored field-weight coefficients, at a second stage computes derived feature sets by applying layer-specific non-linear combination rules to the initial feature vector, at a third stage iteratively refines the derived feature sets by updating each feature set according to a refinement rule that compares a current feature value with a historical reference held in an analytical memory buffer, and at a fourth stage aggregates refined feature sets into representation arrays by concatenating them in a predetermined order and storing resulting arrays as the internal representation values used for evaluating the ledger-configuration sets.

18. The method of claim 1, wherein modifying at least one ledger-configuration field or instruction-sequence ordering based on the execution telemetry comprises executing a telemetry-to-behavior mapping routine that includes segmenting the execution telemetry into processing-time segments, validation-outcome segments, and propagation-delay segments, generating a telemetry deviation profile by computing a difference between values of each segment and corresponding stored baseline values, determining which ledger-configuration field or instruction-sequence pointer is linked to the segment showing a highest deviation by consulting a stored linkage table that maps telemetry segment types to configuration fields or pointer groups, computing an updated field value or pointer offset by applying a deviation-proportional scaling rule to an identified field or pointer, and writing the updated field value back into the at least one ledger-configuration field or instruction sequence before initiating a next execution cycle.

19. A computer-implemented system for implementing the method of claim 1, the computer-implemented system comprising one or more processors and a memory storing executable instructions which, when executed by the one or more processors, cause the system to perform operations comprising:

receiving, by a telemetry acquisition unit, a smart-city telemetry originating from a plurality of subsystems of a smart-city infrastructure, the smart-city telemetry comprising subsystem-specific timestamps and numerical measurements;

dividing, by a segmentation unit, the smart-city telemetry into temporally bounded slices by identifying timestamp intervals for each subsystem and assigning, to each slice, a slice index generated by a monotonically increasing counter stored in the memory;

constructing, by a temporal-alignment unit, an alignment table by comparing timestamps of the slice across the plurality of subsystems, determining timestamp offsets and drift values, and identifying missing or misaligned entries within the slices based on predetermined alignment-detection rules stored in the memory;

reconstructing, by an interpolation unit, missing telemetry values by referencing nearest-neighbor slices identified through alignment-table lookups, generating reconstructed values using interpolation rules stored in the memory, and replacing incomplete slice entries with the reconstructed values;

generating, by a fusion unit, fused multi-field records by combining subsystem-specific values of each slice according to positional mapping rules stored in a mapping dataset accessible to the memory, and appending boundary-limit flags and correlation markers derived from cross-subsystem relationship computations;

generating, by an AI-analytical unit, internal representation values by applying a sequence of weighted computational transformations to the fused multi-field records, the internal representation values characterizing security-related deviations, privacy-related sensitivities, and scalability-related workload progressions;

generating, by a configuration-evaluation unit, a plurality of candidate ledger-configuration sets, comparing the internal representation values with fields of the candidate ledger-configuration sets, computing evaluation profiles based on comparison, and selecting a candidate ledger-configuration set for application to blockchain ledger behavior; and generating, by an instruction-construction unit, state-adjustment instruction sequences by interpreting software-engineering specifications stored in the memory, constructing conditional execution descriptions, mapping the conditional execution descriptions to state-adjustment structures, encoding the state-adjustment structures into machine-interpretable instruction sequences, and dispatching the machine-interpretable instruction sequences to distributed processing nodes of a blockchain network for execution and feedback-driven adaptation.

\* \* \* \* \*